Sept. 26, 1961 M. E. KROM 3,002,054

TRUCK CONCENTRATOR FOR TELEPHONE ANSWERING SERVICE

Filed Sept. 29, 1958 18 Sheets-Sheet 1

INVENTOR
M. E. KROM
BY Donald M Duft
ATTORNEY

TRUCK CONCENTRATOR FOR TELEPHONE ANSWERING SERVICE

Filed Sept. 29, 1958 18 Sheets-Sheet 2

INVENTOR
M. E. KROM
BY
Donald M Duft
ATTORNEY

Sept. 26, 1961 M. E. KROM 3,002,054

TRUCK CONCENTRATOR FOR TELEPHONE ANSWERING SERVICE

Filed Sept. 29, 1958 18 Sheets-Sheet 3

INVENTOR
M. E. KROM
BY
Donald M Duft
ATTORNEY

TRUCK CONCENTRATOR FOR TELEPHONE ANSWERING SERVICE
Filed Sept. 29, 1958 18 Sheets-Sheet 4
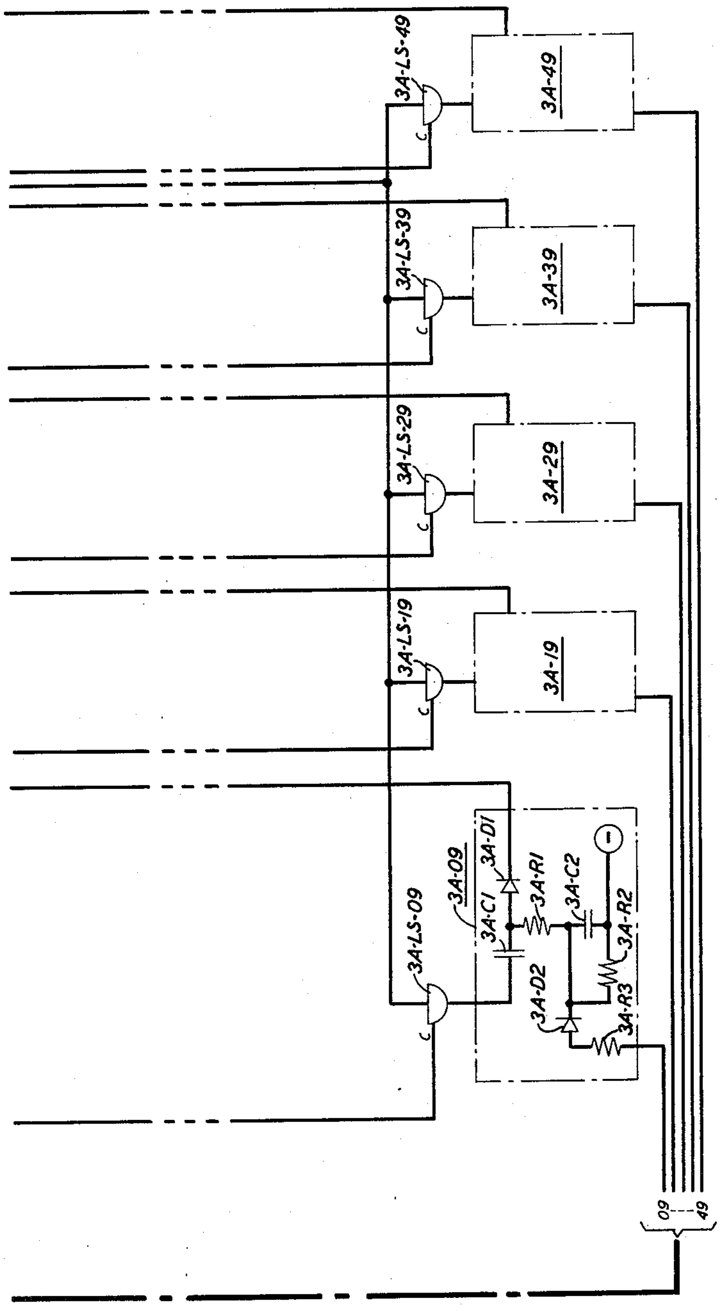
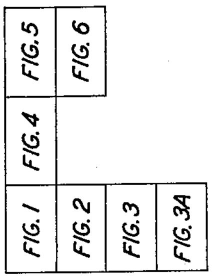
FIG. 18
FIG. 3A
INVENTOR
M. E. KROM
BY Donald M Duft
ATTORNEY

TRUCK CONCENTRATOR FOR TELEPHONE ANSWERING SERVICE

Filed Sept. 29, 1958 18 Sheets-Sheet 5

INVENTOR
M. E. KROM
BY
Donald M Duft
ATTORNEY

Sept. 26, 1961 M. E. KROM 3,002,054

TRUCK CONCENTRATOR FOR TELEPHONE ANSWERING SERVICE

Filed Sept. 29, 1958 18 Sheets-Sheet 6

INVENTOR
M. E. KROM
BY
Donald M Duft
ATTORNEY

Sept. 26, 1961 M. E. KROM 3,002,054

TRUCK CONCENTRATOR FOR TELEPHONE ANSWERING SERVICE

Filed Sept. 29, 1958 18 Sheets-Sheet 7

INVENTOR
M. E. KROM
BY
Donald M Duft
ATTORNEY

INVENTOR
M. E. KROM
BY
Donald M Duft
ATTORNEY

ENABLING GATE
(NORMALLY INHIBITED)

INHIBIT GATE
(NORMALLY ENABLED)

INVENTOR
M. E. KROM
BY Donald M Duft
ATTORNEY

Sept. 26, 1961 M. E. KROM 3,002,054
TRUCK CONCENTRATOR FOR TELEPHONE ANSWERING SERVICE
Filed Sept. 29, 1958 18 Sheets-Sheet 10

INVENTOR
M. E. KROM
BY
Donald M Duft
ATTORNEY

INVENTOR
M. E. KROM
BY Donald M Duft
ATTORNEY

TRUCK CONCENTRATOR FOR TELEPHONE ANSWERING SERVICE

INVENTOR
M. E. KROM
BY
Donald M Duft
ATTORNEY

TRUCK CONCENTRATOR FOR TELEPHONE ANSWERING SERVICE

Filed Sept. 29, 1958 18 Sheets-Sheet 13

PULSE AMPLIFIER (P)

(UNLESS OTHERWISE SPECIFIED: RESITANCE VALUES ARE IN OHMS, CAPACITANCE VALUES ARE IN MICROFARADS)

FUNCTIONAL SYMBOL

INVENTOR
M.E. KROM

BY Donald M Duft

ATTORNEY

AMPLIFIER (RS)

(UNLESS OTHERWISE SPECIFIED: RESISTANCE VALUES ARE IN OHMS, CAPACITANCE VALUES ARE IN MICROFARADS.)

FUNCTIONAL SYMBOL

INVENTOR
M. E. KROM
BY Donald M Duft
ATTORNEY

FLIP-FLOP (F/F)
(UNLESS OTHERWISE SPECIFIED: RESISTANCE VALUES ARE IN OHMS, CAPACITANCE VALUES ARE IN MICROFARADS.)

FUNCTIONAL SYMBOL

INVENTOR
M. E. KROM
BY
Donald M Duft
ATTORNEY

FIG. 15A
PULSE GENERATOR (PG)
(UNLESS OTHERWISE SPECIFIED: RESISTANCE VALUES ARE IN OHMS, CAPACITANCE VALUES ARE IN MICROFARADS)
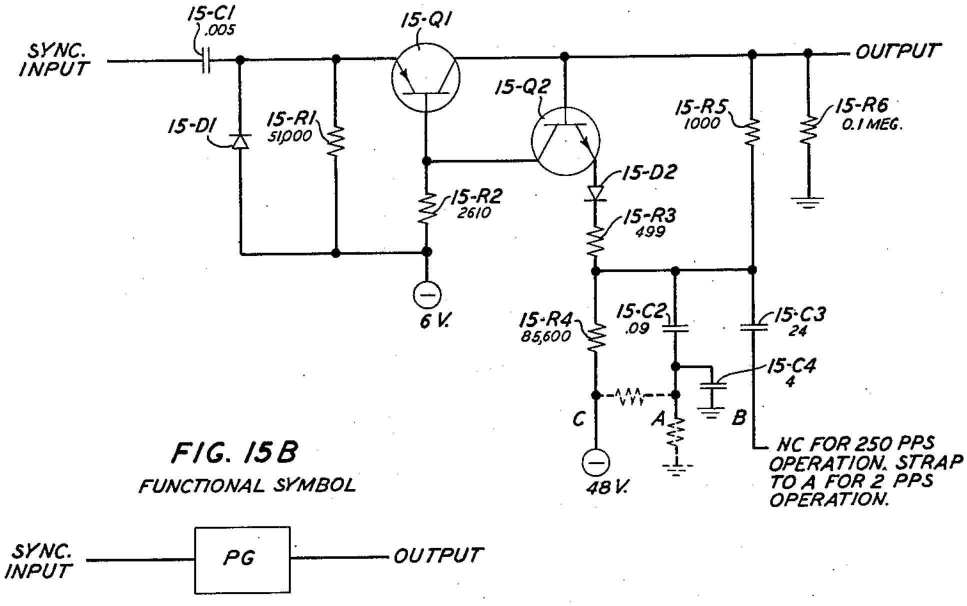
FIG. 15A, FIG. 15B
FIG. 15C
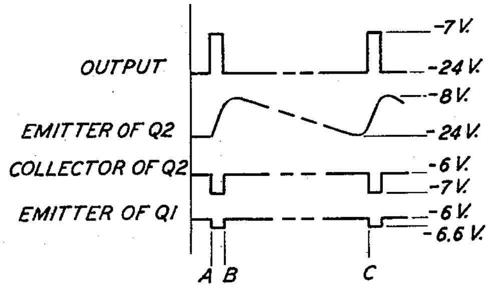
INVENTOR
M. E. KROM
BY
Donald M Duft
ATTORNEY

TRANSMITTING AMPLIFIER (T)

(UNLESS OTHERWISE SPECIFIED: RESISTANCE VALUES ARE IN OHMS, CAPACITANCE VALUES ARE IN MICROFARADS.)

FUNCTIONAL SYMBOL

INVENTOR
M.E. KROM
BY Donald M Duft
ATTORNEY

RECEIVING AMPLIFIER (R)

(UNLESS OTHERWISE SPECIFIED: RESISTANCE VALUES ARE IN OHMS, CAPACITANCE VALUES ARE IN MICROFARADS)

FUNCTIONAL SYMBOL

INVENTOR
M. E. KROM
BY
Donald M Duft
ATTORNEY

United States Patent Office 3,002,054
Patented Sept. 26, 1961

3,002,054

TRUCK CONCENTRATOR FOR TELEPHONE ANSWERING SERVICE

Myron E. Krom, Convent Station, N.J., assignor to Bell Telephone Laboratories, Incorporated, New York, N.Y., a corporation of New York Filed Sept. 29, 1958, Ser. No. 764,143
13 Claims. (Cl. 179—27)

Figure 1:
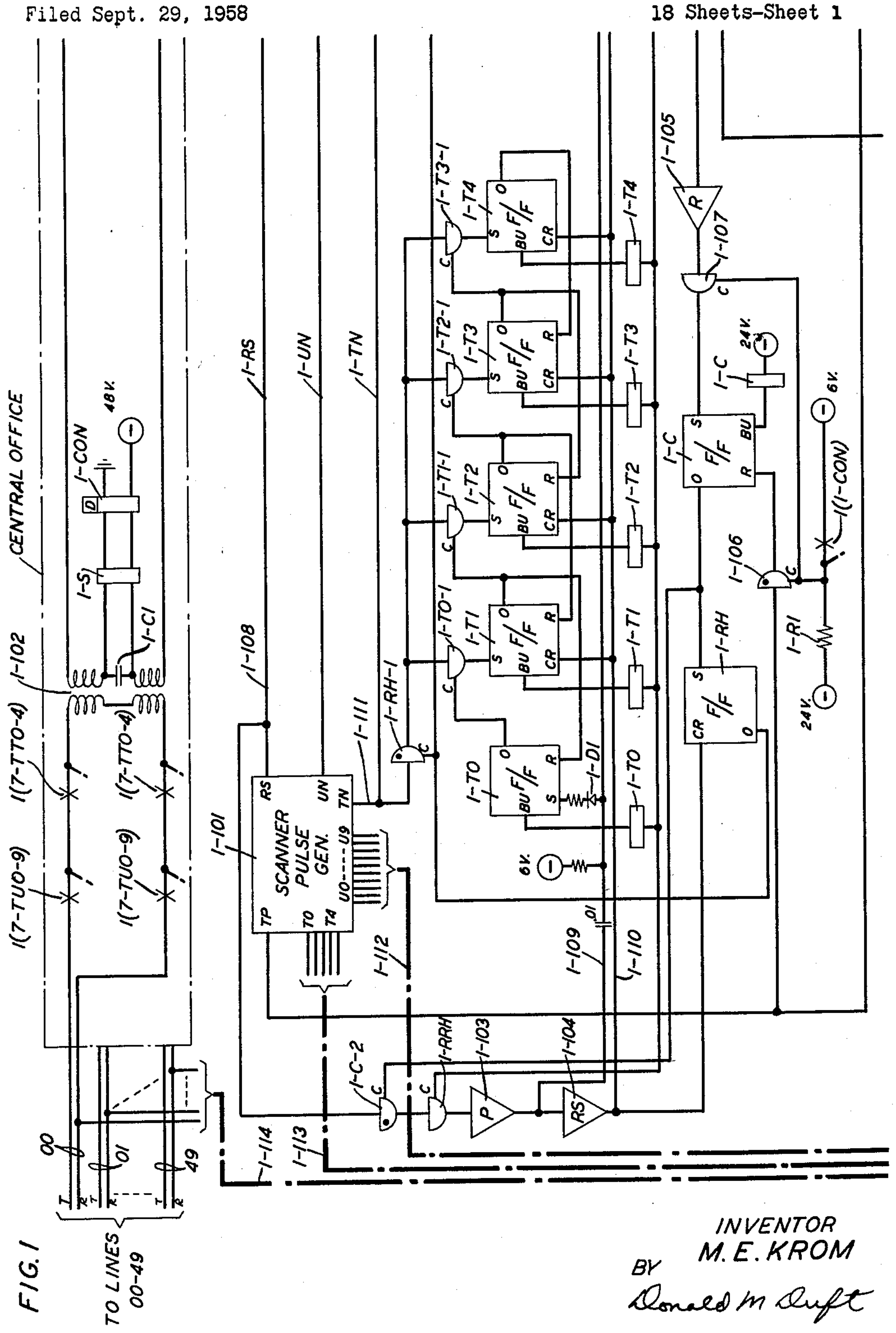

This invention pertains to a switching system and, more particularly to a trunk concentrator designed for telephone answering service use.

Ever since the advent of the telephone, inventors have been concerned with developing new and improved ways of serving calls directed to telephones of absent subcribers. This development effort has produced two general methods of solution of the problem. The first method comprises the connection of a recorder to the telephone line of a subscriber desiring such service. The recorder is usually located at the premises of the subscriber and, upon the reception of a call thereat during his absence, first plays a prerecorded message advising the calling party that the called party is not available and that the calling party may, if desired, record a brief message stating the nature of his business. The second method comprises the connection of the subscriber's line to a telephone answering service which answers his telephone and takes any incoming messages for him during his absence. Telephone answering systems offer an advantage over a mechanical recorder in that an operator answers each incoming call and can, in case of emergency, contact the absent subscriber, providing he left a forwarding telephone number, and advise him of the emergency.

Although telephone answering service is highly desirable, and in many cases preferable to a mechanical recorder, the use of such service has been impeded somewhat by the high cost of the trunks interconnecting the answering service center with the subscriber's lines. The trunk cost has been high because, heretofore, it was usually necessary to provide an individual trunk pair to interconnect the answering service center with the central office appearance of each subscriber line served by the answering service. This necessity forced answering services located in large metropolitan centers to adopt one of two modes of operation, neither of which was ideal. First, they could provide one large centrally located answering service center and then run an individual trunk pair from this center to the central office appearance of each observed subscriber line, regardless of how near or how far the central offices involved were located from the answering service center. This alternative resulted in high trunk costs for those subscribers whose central offices were remotely located from the answering service center. The second alternative available was to provide a plurality of smaller answering service centers, each of which was located as advantageously as possible so as to reduce trunk expenses. The reduced trunk expenses in this alternative, however, were offset to some extent by the necessity of providing one or more operators at each location, regardless of how light the traffic may be.

It may, therefore, readily be seen that the ideal solution for an economical answering service system would be the provision of a single centrally located center in combination with a switching system which would reduce trunk costs by eliminating the necessity of providing an individual trunk pair between the answering service center and the central office appearance of each observed line.

It is therefore an object of this invention to provide an improved switching system for use with an answering service.

It is a further object of the invention to provide a new and improved switching system for reducing the trunk costs of telephone answering services.

It is a further object of the invention to provide an improved answering service switching system which eliminates the necessity of providing a separate pair of wires between the answering service center and each observed subscriber's central office line appearance.

In accordance with the present invention, an electronic line scanner is provided in each central office having subscriber lines that are to be served by the answering service. The scanner in each office repeatedly and sequentially scans the plurality of lines under observation therein to derive information regarding the idle or ringing condition of each line. This information is transmitted to the answering service center where receiving equipment responds thereto and provides a continuous display of the condition of all lines under observation. An operator at the answering service center, upon noticing the ringing condition of an observed line, interconnects her position with the called line over a talking trunk common to all observed lines in the office to communicate with the calling subscriber.

A central office is interconnected with the answering service center by a minimum of four trunk pairs of which three pairs are used for the interchange of timing and control signals between the two points, while the fourth pair is used as a talking trunk to connect the answering center operator's position with any observed line to which a call is currently directed. The four trunk pairs enable the answering service center to monitor the idle or ringing condition of all lines under observation at a central office and to answer any calls incoming thereto.

The system operation is controlled from the central office by means of a pulse generator which comprises part of the scanner and which generates the timing pulses necessary for the system operation. The timing pulses drive a counter circuit having an operative position individual to each observed line. Thus, for example, if fifty lines are under observation at a particular central office, the counter circuit thereat would have fifty operative positions for counting up to fifty. The counter advances one position in response to each timing pulse.

The same pulses which drive the counter circuit at the central office are transmitted over the signaling trunks to the answering service center where they are applied to a counter circuit which is similar to the one in the central office. The pulses are applied to this counter in such a manner that it operates in synchronism with the one in the central office.

The timing pulses at the central office, together with the counter thereat, drive a matrix comprising a plurality of line scanning gates, one for each line under observation. Assuming again that there are fifty lines under observation, there would be fifty scanning gates numbered 00 through 49 which would be sequentially enabled by the timing pulses. There is a connection between each scanning gate and the observed line associated therewith whereby if at the time a particular gate, for example, scanning gate 02 is enabled, line 02 has ringing current thereon, gate 02 causes a pulse to be transmitted over the signaling trunks to the answering service center. This pulse represents a ringing condition of line 02.

The counter in the answering service center drives a similar matrix having a gate individual to each counter position as well as individual to each line under observation at the central office. Each gate is sequentially enabled as its associated counter position becomes operative. Remembering, that the counters in the central office and the answering center are in synchronism, the transmission of a ringing pulse to the answering center at the time line 02, for example, is scanned, causes this pulse to pass through the enabled gate at the answering service center associated with line 02 and operate a utilization circuit which effects the energization of a signal device, of which there is an individual one for each line under observation, to indicate to the operator on duty that a call is currently being directed to this particular line.

The operator, upon observing the ringing signal, operates a switch individual to the observed line now being called, line 02 for example, which effects the necessary circuit actions to interconnect her position with the talking trunk interconnecting the answering service center and the central office in which this called line is located. The operation of this switch directs the output of the answering service gate matrix to one of the signaling trunks leading back to the central office. Then, during the next scan, the output pulse from the central office matrix gate associated with line 02 is directed via this signaling trunk back to the central office.

Upon the reception of this pulse at the central office, further circuit actions are effected to block the operation of the counter in the operative position associated with line 02. The counter thereby stops its operation and effects the operation of a relay network which interconnects the central office end of the talking trunk with called line 02, thereby enabling the operator at the answering service center to converse with the calling party.

After this connection is made, the counter, as well as the rest of the circuit, resumes its normal operation and resumes its scanning of the remaining lines for their busy or ringing condition. Thus, during the time the operator is answering a call, the circuit continues its operation and displays a signal at the answering service center each time a call is directed to additional ones of the observed lines.

It has been discussed how there are three signaling trunk pairs and one talking trunk pair interconnecting a central office and the answering service center. This arrangement allows the answering service center to answer only one call in a central office at a time. If it is desired to provide greater answering capacity for any central office, additional talking trunk pairs may be provided as needed. Each additional talking trunk pair will enable an additional operator at the answering center to answer other calls while a first operator is busy answering a prior call in the same office.

A feature of the invention is the provision of a scanner for repeatedly ascertaining the ringing or idle condition of each of a plurality of lines and transmitting this information over a trunk to a distant point.

A further feature of the invention is the provision of a scanner for repeatedly ascertaining the idle or ringing condition of each of a plurality of lines and transmitting the results of each scan over a trunk to a remote location where equipment thereat responds thereto and provides an indication of the idle or ringing condition of each line.

A further feature of the invention is the provision of a scanner for repeatedly testing the idle or ringing condition of a plurality of lines at a first location together with a plurality of gates at a distant location which are enabled in synchronism with the scanner and which, in response to information received from the scanner, operate additional equipment to provide an indication of the ringing or idle condition of each line.

A further feature of the invention is the provision of a scanner for repeatedly testing the idle or ringing condition of a plurality of lines at a first location and transmitting the results of each test over a trunk to a distant location having a plurality of gates which are enabled in synchronism with the scanner and which, in response to the information received over the trunk, operate associated equipment to provide an indication of the ringing or idle condition of each line.

A further feature of the invention is the provision of a scanner for repeatedly testing the idle or ringing condition of a plurality of lines in a central office and, in response to each test, for transmitting the results thereof to a remote center containing a plurality of control circuits, one for each line at the central office, whereby upon the reception of this information from the central office, the control circuit associated with a called line provides a means for redirecting a signal back to the central office which, in response thereto, blocks the operation of the scanner thereat and interconnects the called line with the remote location.

A further feature of the invention is the provision of a scanner for repeatedly testing the idle or ringing condition of a plurality of lines in a central office and, in response to each test, for transmitting the results thereof to a remote center containing a plurality of control circuits, one for each line at the central office, whereby, upon the reception of this information from the central office, the control circuit associated with a called line provides a means for redirecting a signal back to the central office which, in response thereto, momentarily blocks the operation of the scanner thereat.

A further feature of the invention is the provision of a plurality of crosspoints comprising a matrix in combination with a corresponding plurality of lines together with means for sequentially enabling each crosspoint whereby a pulse is passed through a crosspoint when enabled if the line connected thereto is currently in a ringing condition.

A further feature of the invention is the provision of a plurality of crosspoints comprising a matrix in combination with a corresponding plurality of lines together with means for sequentially enabling each crosspoint whereby a signal is passed through a crosspoint when enabled and applied to a communication path if the line associated with the enabled crosspoint is currently in a ringing condition.

A further feature of the invention is the provision of a plurality of lines in combination with a matrix having a corresponding plurality of crosspoints which are sequentially enabled whereby each line in a ringing condition at the time its associated crosspoint is enabled effects the transmission of a signal to a remote location containing equipment thereat which manifests the ringing or idle condition of each line.

A further feature of the invention is the provision of a plurality of lines in combination with a matrix having a corresponding plurality of crosspoints, one for each line, which are sequentially enabled whereby each line currently in a ringing condition at the time its associated crosspoint is enabled effects the transmission of a signal to a remote location containing equipment thereat which manifests the ringing or idle condition of each line and provides for the return of a signal to the central office for effecting the interconnection of a called line with the remote location.

Figure 8A:
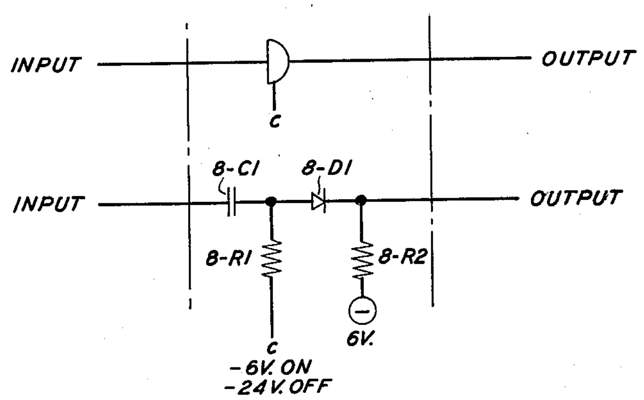
Figure 8B:
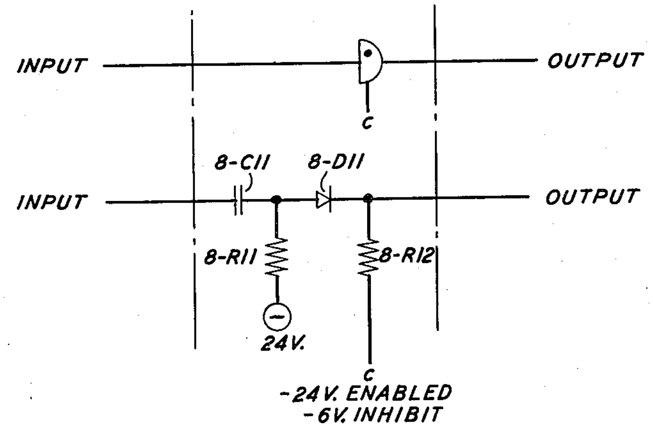
Figure 10:
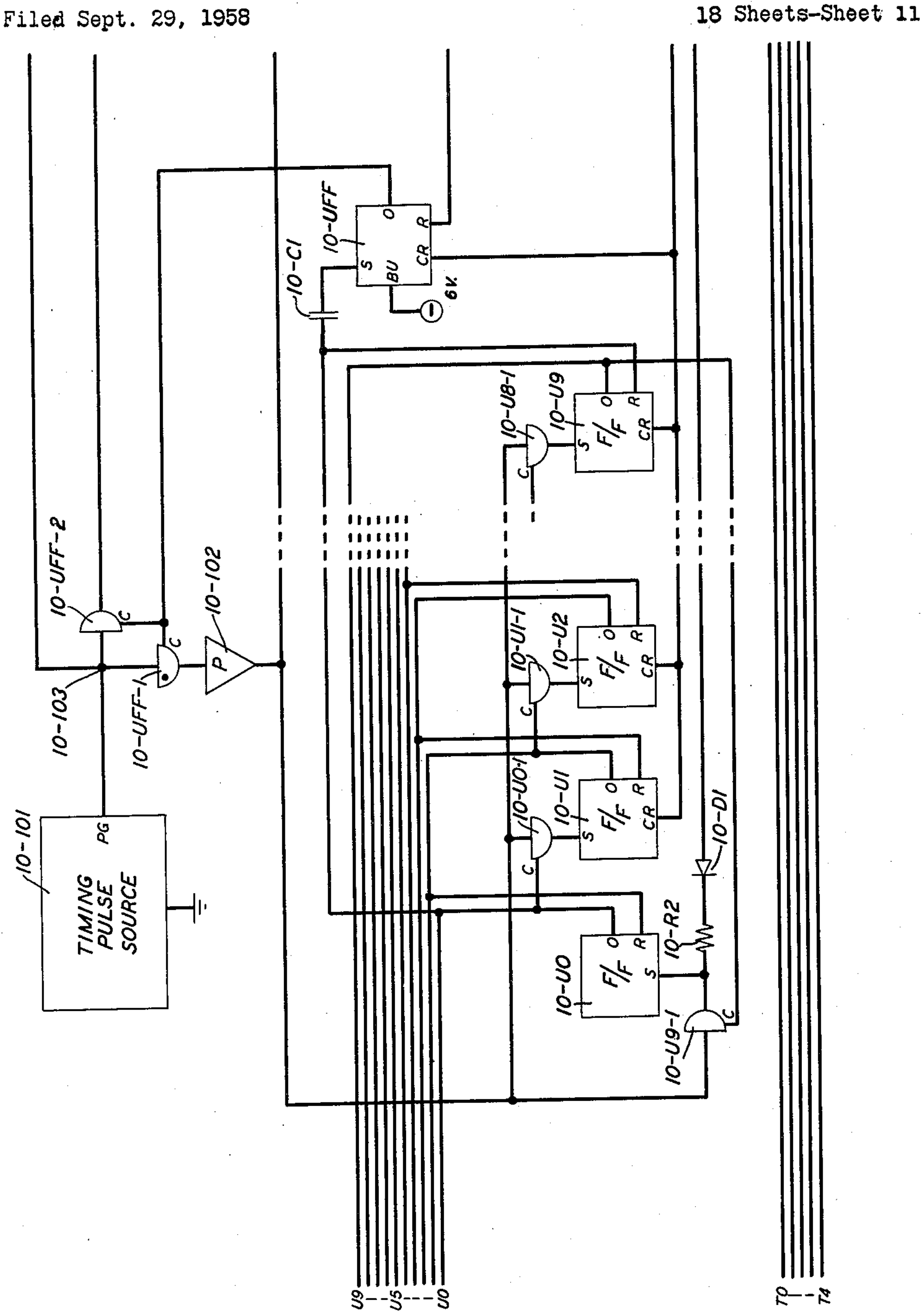
Figure 11:
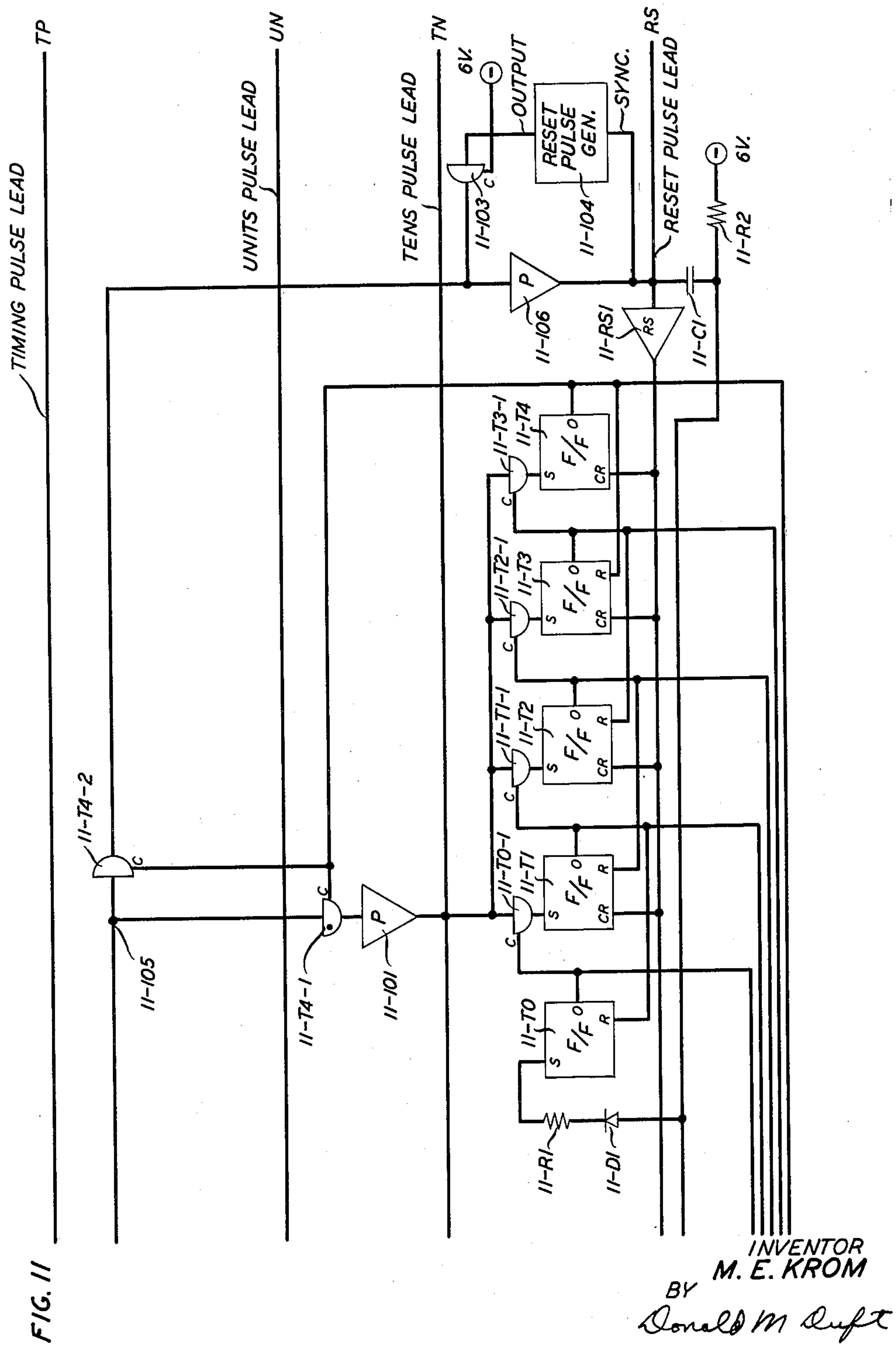
Figure 12A:
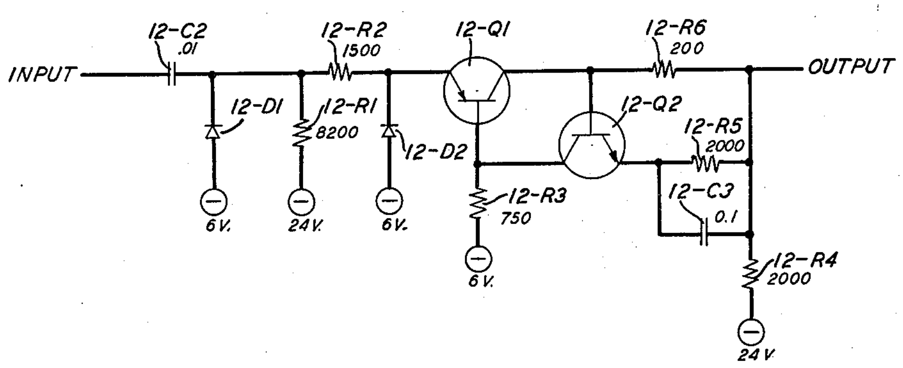
Figure 12B:
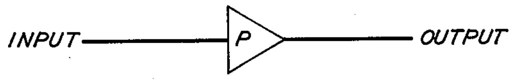
Figure 12C:
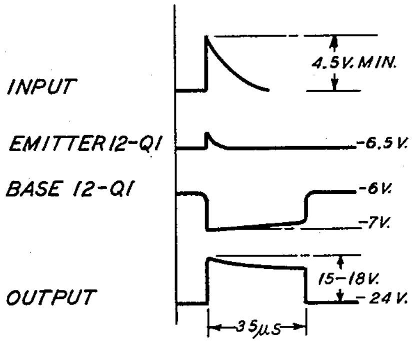
Figure 13A:
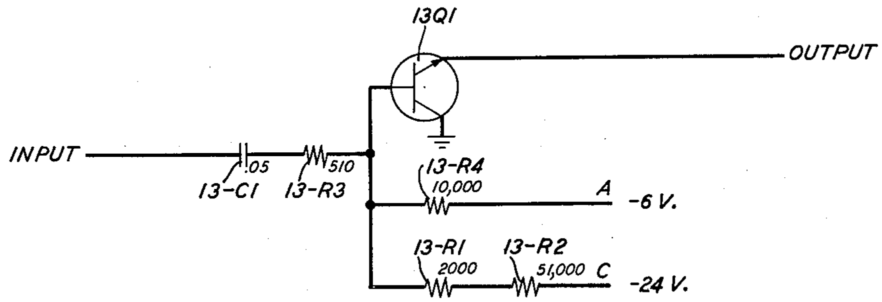
Figure 13B:
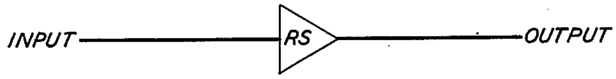
Figure 13C:
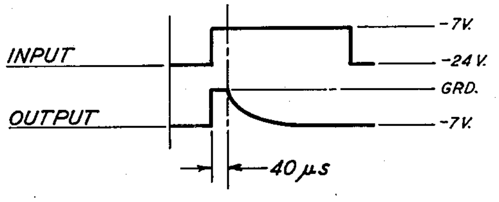
Figure 14A:
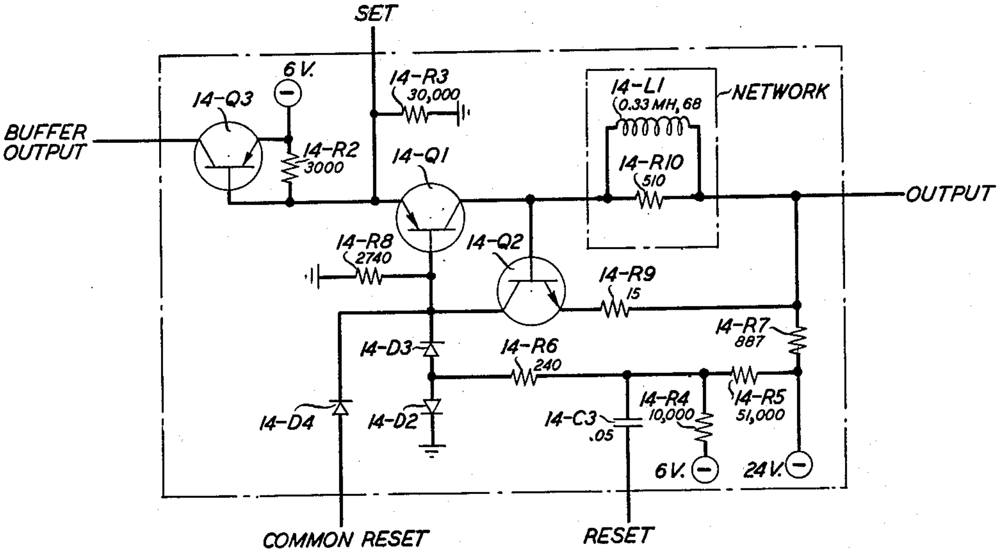
Figure 14C:
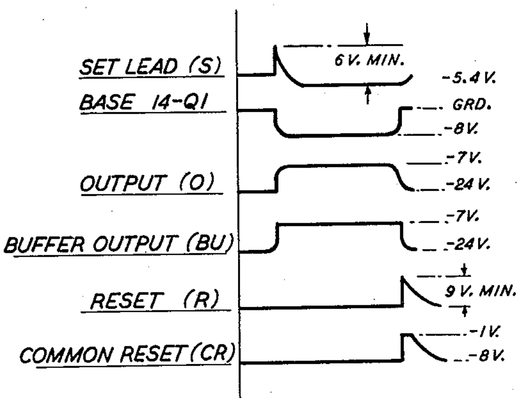
Figure 14B:
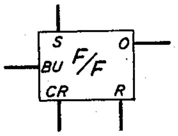
Figure 16A:
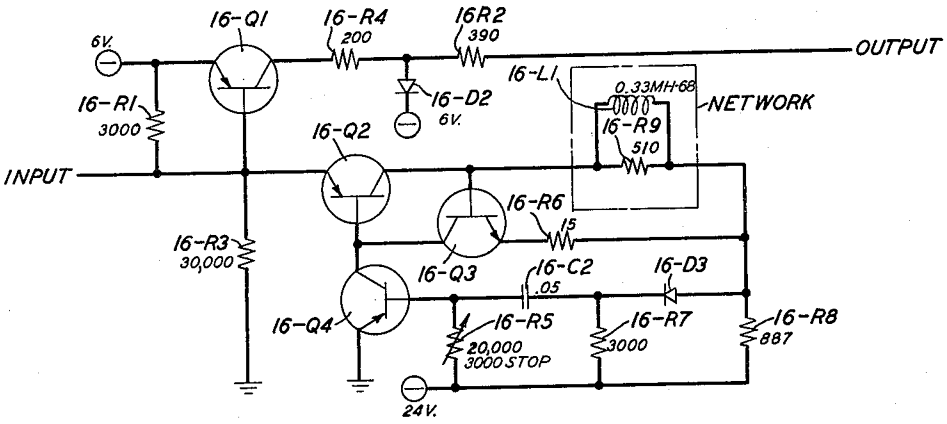
Figure 16B:
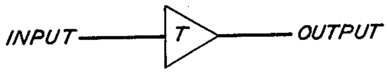
Figure 16C:
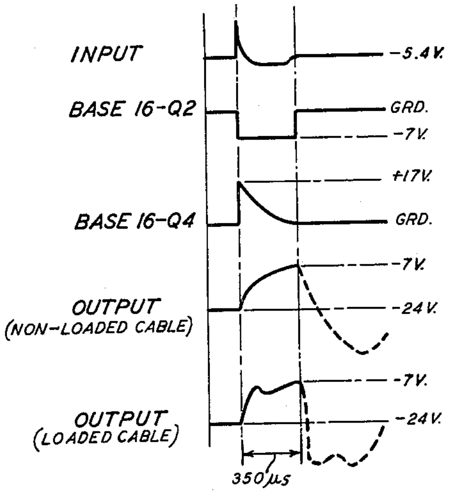
Figure 17A:
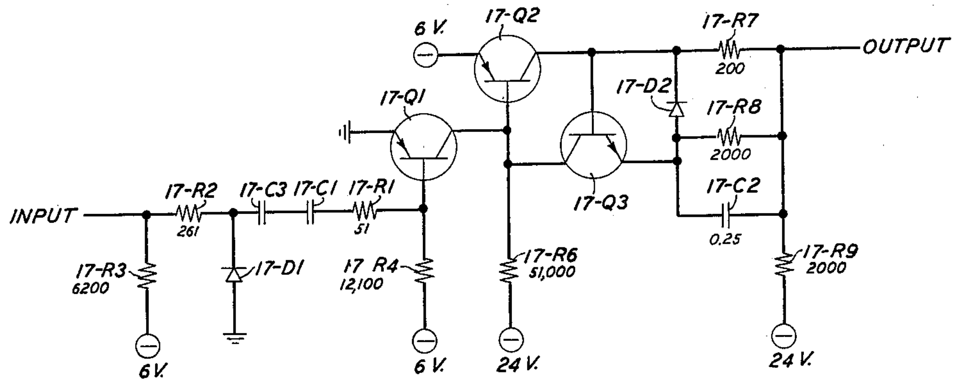
Figure 17B:
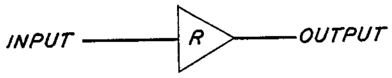
Figure 17C:
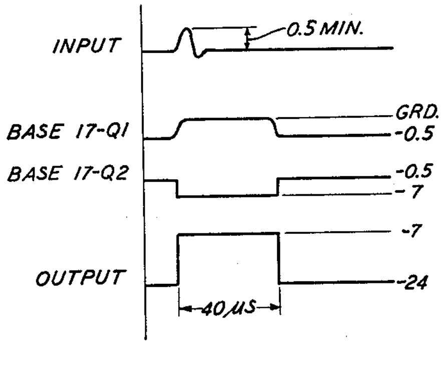

These and other objects and features of the invention will be more readily understood when read in connection with the following detailed description and drawings in which:

FIGS. 1 through 7 together disclose the answering service switching system comprising the present invention;

FIGS. 8A and 8B disclose the circuit details of the enabling and inhibiting gates used throughout the present system;

FIGS. 9A through 9M show the various pulses produced by the scanner pulse generator circuit;

FIGS. 10 and 11 disclose the circuit details of the scanner pulse generator;

FIGS. 12A, 12B, and 12C, respectively, disclose the circuit details, the functional symbol and the wave shapes, respectively, of the pulse amplifiers employed in the present system;

FIGS. 13A through 13C, respectively, disclose the circuit details, the functional symbol and wave shapes, respectively, of the reset amplifiers;

FIGS. 14A through 14C, respectively, disclose the circuit details, the functional symbol and wave shapes, respectively, of the flip-flops;

FIGS. 15A through 15C, respectively, disclose the circuit details, the functional symbol and the wave shapes, respectively, of the timing pulse generator;

FIGS. 16A through 16C, respectively, disclose the circuit details, the functional symbol and the wave shapes, respectively, of the transmitting amplifiers;

FIGS. 17A through 17C, respectively, disclose the circuit details, the functional symbol and the wave shapes, respectively, of the receiving amplifiers; and FIG. 18 shows how FIGS. 1 through 6 should be arranged with respect to one another.

*Description of system operation*

Many of the individual circuits used in this present system are shown in functional form only on FIGS. 1 through 7. For example, the different types of amplifiers used are all represented by a triangle with the letters inside the triangle indicating the specific type of amplifier represented thereby. Similarly, flip-flops are represented by a rectangle. The circuit details of each individual circuit shown in functional form on FIGS. 1 through 7 are shown on other sheets of the drawings. This arrangement allows the system operation per se to be understood with a minimum of effort and, at the same time, provides a full disclosure of every circuit used in the system.

The detailed description of each component circuit for example, flip-flops, pulse generators, reset amplifiers, et cetera, is contained on the pages following the description of the system per se. However, it is believed advisable to precede the system description with a few brief comments concerning the functional symbols on FIGS. 1 through 7.

The gates used in this system are functionally represented as a semicircle having an input lead, an output lead and a control lead as shown on FIGS. 8A and 8B. A semicircle having a dot on the inside represents an inhibiting gate while a semicircle having no dot represents an enabling gate. An inhibiting gate, such as for example, gate 1–C–2, normally allows pulses appearing on the input lead to pass through to the output lead except when a potential of a predetermined magnitude and polarity is applied to the control lead, at which time the gate is inhibited and effectively blocks the passage of signals therethrough.

An enabling gate, such as, for example, gate 1–T0–1, normally prevents pulses appearing on the input lead from passing through to the output lead. However, the application of a predetermined potential to the control lead will enable the gate and allow a signal on the input lead to pass through to the output lead.

Many of the gates used in the present system are controlled by flip-flops. In these cases, the output of the flip-flop is connected to the control lead of the gate which, depending upon whether the flip-flop is in a set or a reset condition, applies a control potential to the gate, thereby enabling or inhibiting it depending upon the type of gate. All gates which are controlled from flip-flops are designated in a manner so that their association with the controlling flip-flop may be readily ascertained. For example, flip-flop 1–RH, FIG. 1, controls the operation of gates 1–RH–1 and 4–RH–2. In other words, the alphabetical portion of the designation of a gate serves to associate the gate with its controlling flip-flop, while the numeral comprising the last portion of the designation serves to distinguish the gate from other gates controlled by the same flip-flop.

Four different types of amplifiers are used in the present system, all of which are represented diagrammatically by a triangle with the letters inside the triangle indicating the specific type of amplifier represented thereby. The pulse amplifiers used herein, such as amplifier 1–103 on FIG. 1, are designated by the letter P within a triangle and are shown in detail on FIG. 12A. This amplifier is used for the amplification of pulses within a local circuit. The reset amplifiers, such as amplifier 1–104, are designated by the letters RS within a triangle and are shown in detail on FIG. 13A. These amplifiers are used to generate the pulses which reset the flip-flops to their off condition. The transmitting amplifiers, such as amplifier 4–101 are shown in detail in FIG. 16A and are represented by the letter T within a triangle. These amplifiers are used for the generation of the pulses which are transmitted over the trunks interconnecting the central office with the answering service center. The receiving amplifiers, such as amplifier 1–105, are shown in detail on FIG. 17A and are designated by the letter R within a triangle. These amplifiers are used on the receiving end of the trunk pairs to amplify the pulses received over the trunk pairs.

The flip-flops are represented by a rectangle having a set terminal designated S, an output terminal designated O, a reset terminal designated R, another reset terminal designated CR and a buffer output terminal designated BU. In some cases the buffer output or the CR terminal, or both, are not used, and therefore are not shown. Briefly, the application of a suitable input pulse to the set terminal turns the flip-flop on, at which time an output pulse is applied to both the output terminal and the buffer output terminal. The difference between the output and the buffer output terminals is that the buffer output provides sufficient current to operate a relay or other such device, while the output terminal is essentially a voltage or low power output and is suitable for use only with circuits which use little power. The application of a positive pulse to either the reset or the common reset terminals, or both, will reset the flip-flop from its on condition back to its off condition.

Figure 2:
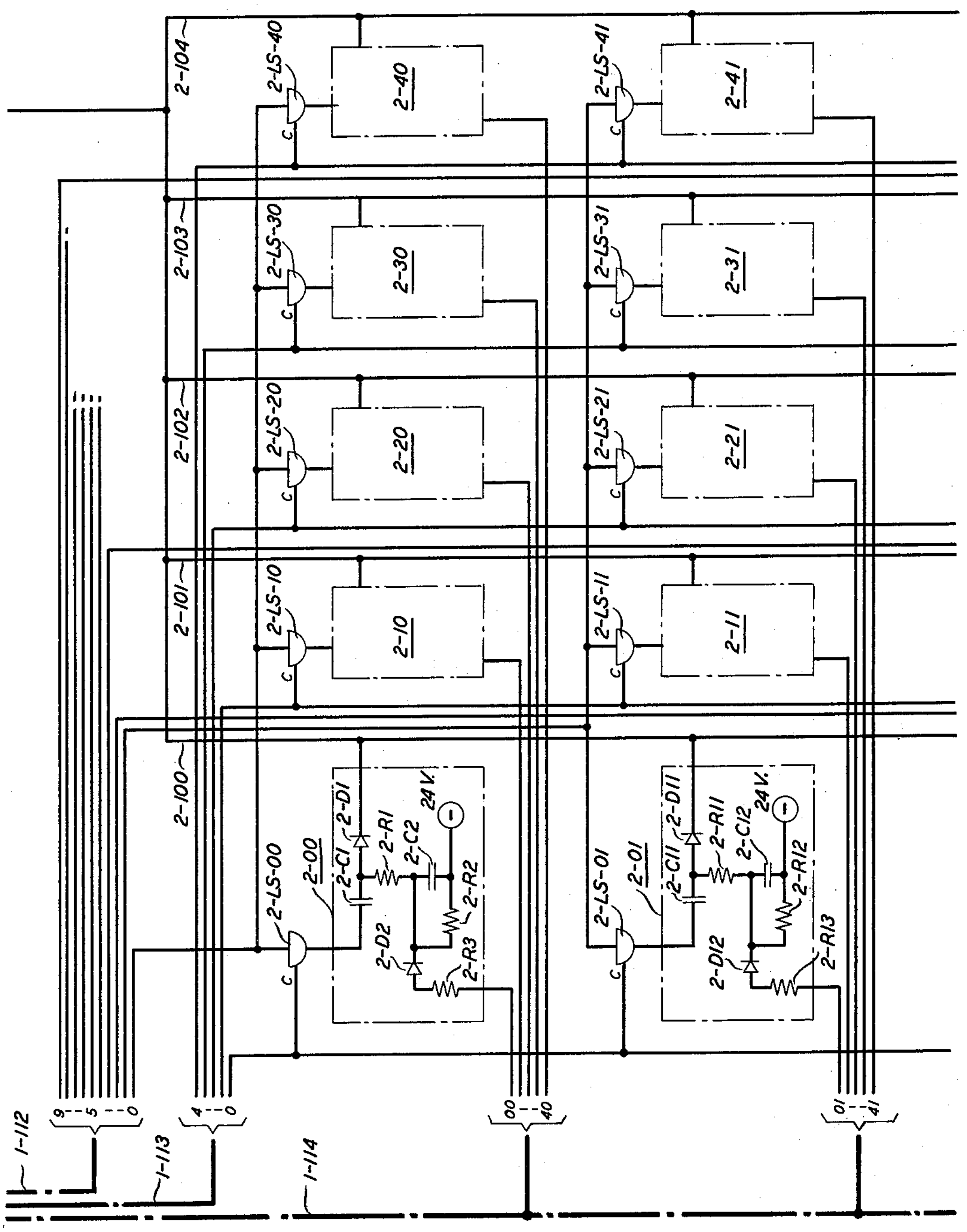
Figure 3:
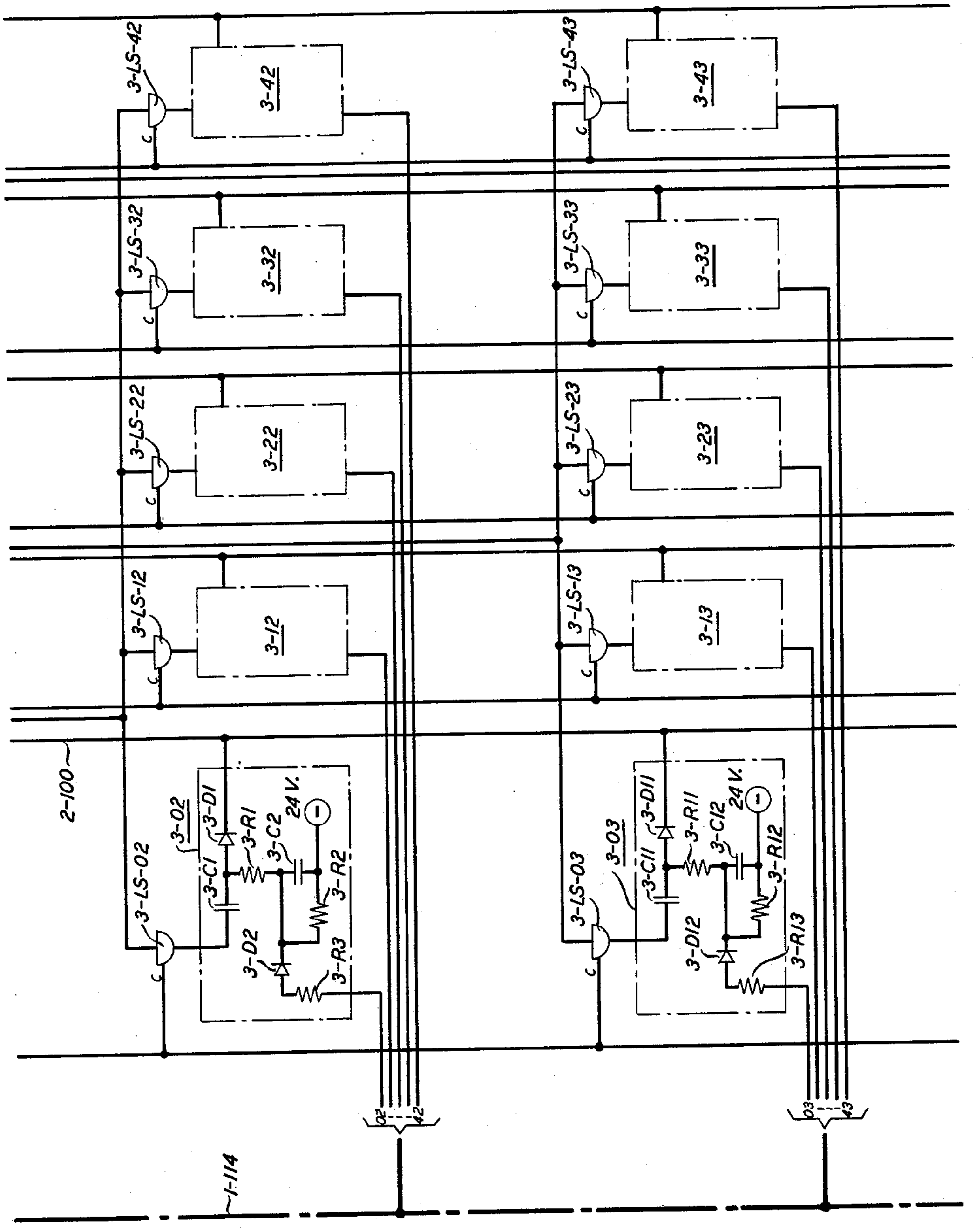
Figure 4:
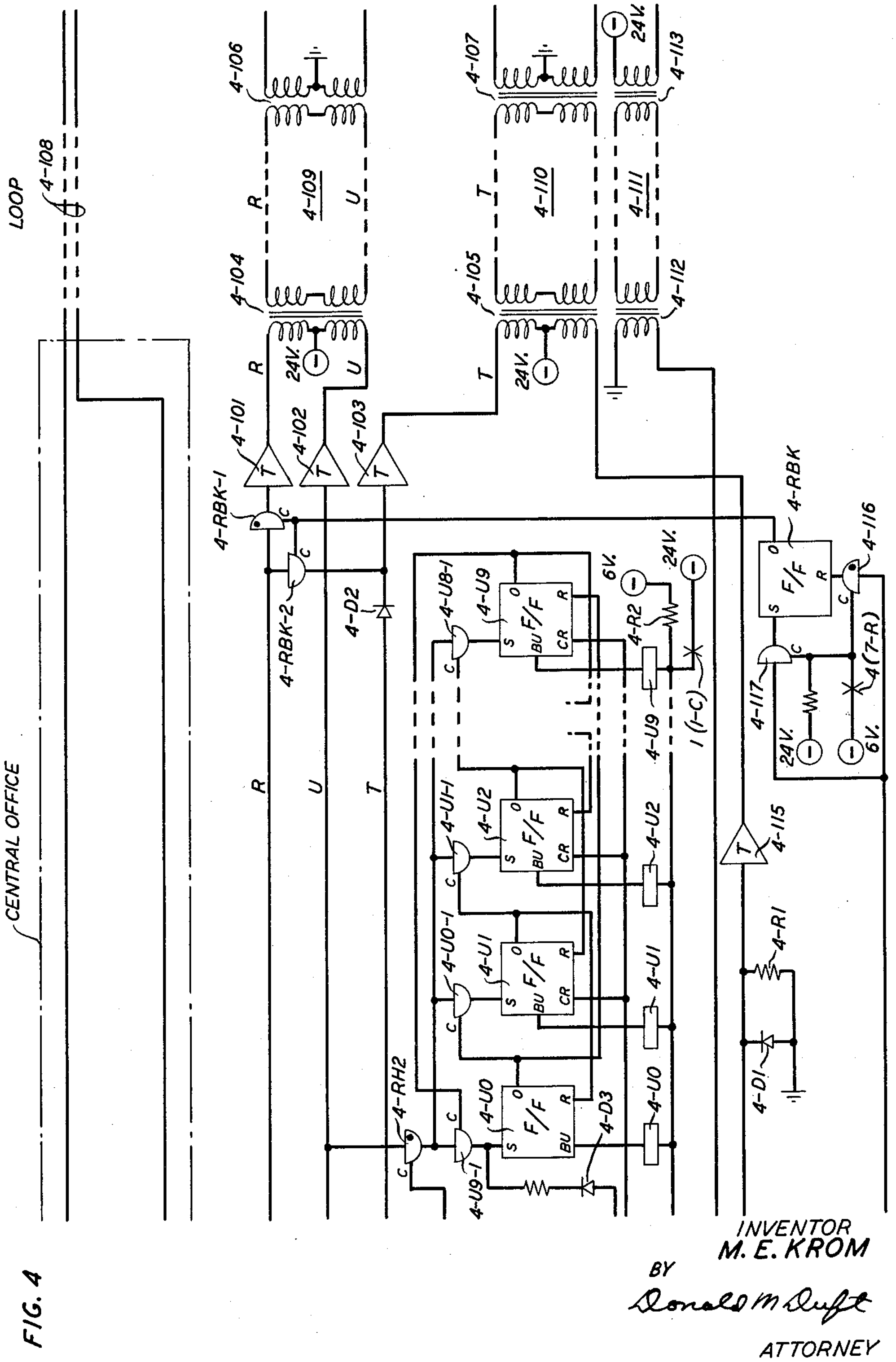
Figure 5:
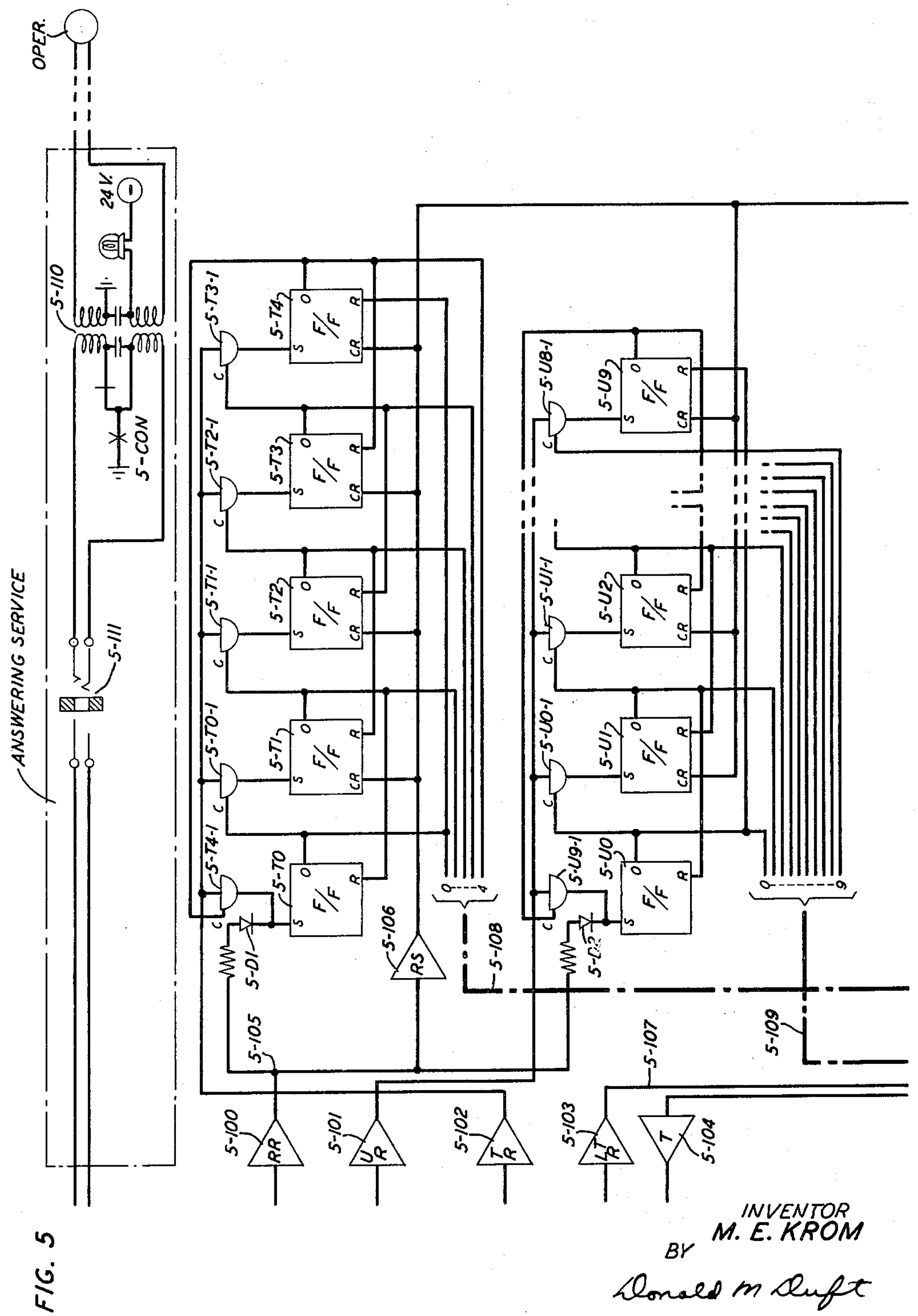
Figure 6:
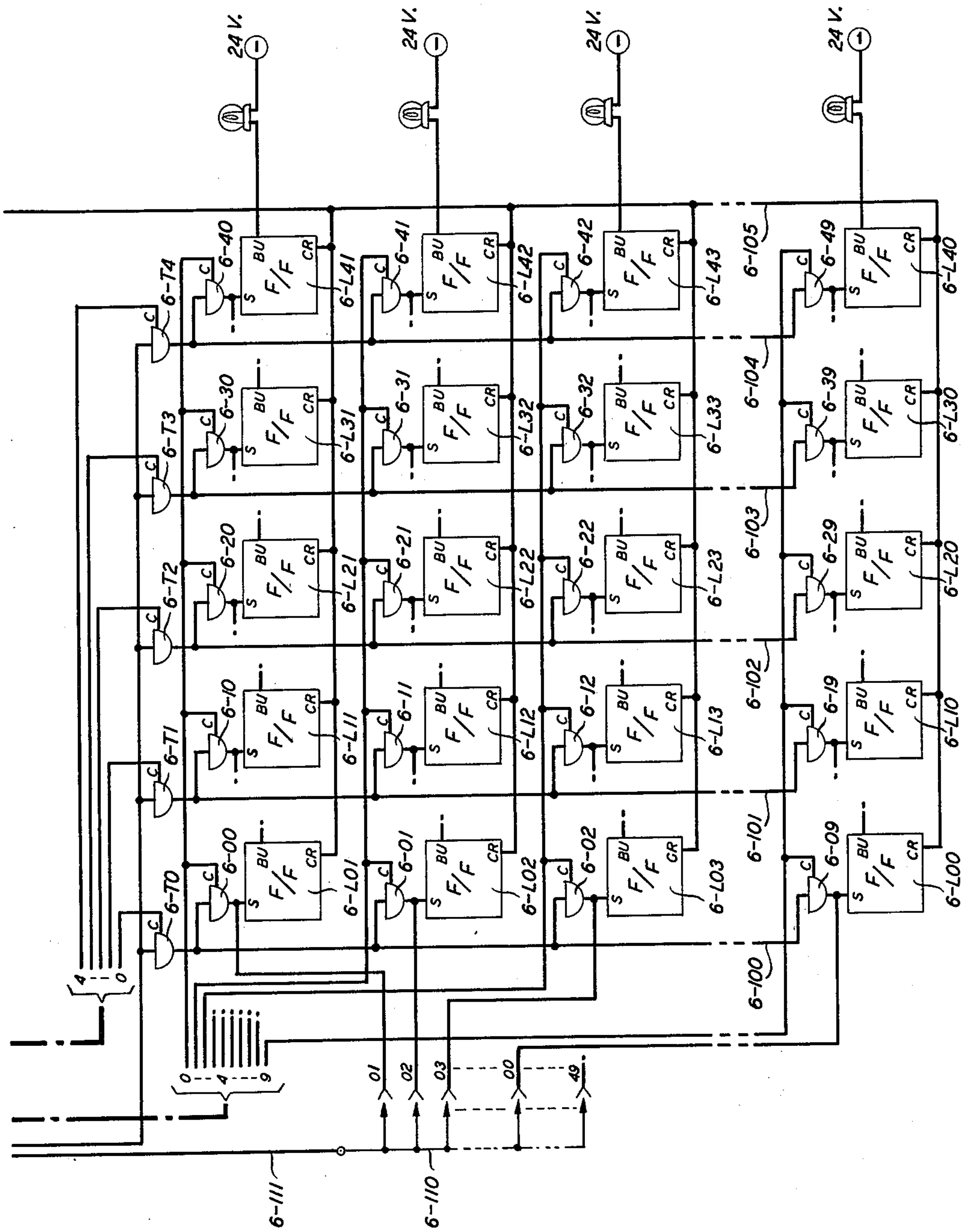

Referring to FIGS. 1 through 7, which together disclose the system comprising the present invention, the equipment shown on FIGS. 1, 2, 3 and the left of the dotted lines on FIG. 4 is located at the central office while that shown to the right of the dotted lines on FIG. 4 as well as that on FIGS. 5 and 6 is located at the answering service center. The central office and the answering service center are interconnected by the four trunk pairs 4–108, 4–109, 4–110 and 4–111 on FIG. 4. Of these, trunk pair 4–108 is a talking trunk and is used to interconnect the operator's switchboard position with an observed line to which a call is currently directed in order that the operator may converse with the calling party. Trunk pairs 4–109 through 4–111, on the other hand, are signaling trunks and are used only for the interchange of pulse information. It is over these three trunk pairs that the pulse information is transmitted which enables the equipment at the answering service center to provide a continuous display of the ringing or idle condition of all lines under observation in the central office.

Scanner pulse generator 1–101 generates the timing pulses which control the operation of the entire system including both the apparatus at the central office and that at the answering service center. The details of this circuit are shown on FIGS. 10 and 11 while the types of pulses generated thereby, together with the relationship therebetween are shown on FIGS. 9A through 9M. This circuit contains a pulse generator circuit in combination with frequency divider and pulse steering circuits. The detailed description of this circuit is contained in the pages following the description of the system operation. However, a few brief comments concerning the general nature of operation of this circuit are inserted at this point since an understanding of the various pulses produced by this circuit, together with the relationship therebetween is necessary for an understanding of the system operation.

Figure 9:
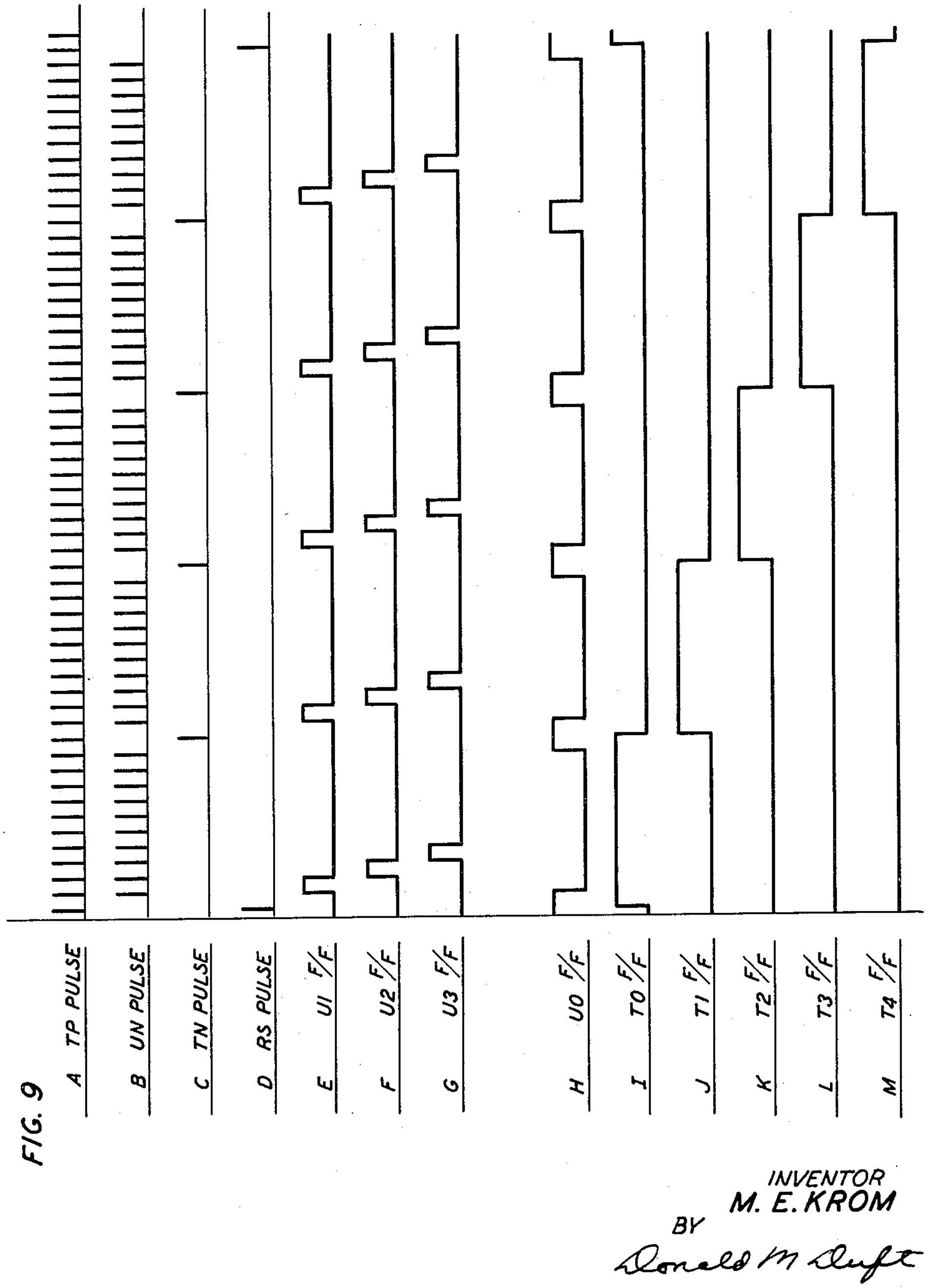

The timing pulses shown on FIG. 9A represent the output of the timing pulse generator contained within the scanner pulse generator. These pulses are generated at an appropriate frequency such as, for example, 250 cycles per second; are applied to the TP output terminal of the scanner pulse generator and, in addition, are applied to the various pulse divider and pulse steering circuits internal to the scanner pulse generator.

Referring both to FIGS. 9A and 9D, it is seen that the leftmost TP timing pulse of FIG. 9A travels through the steering circuit and appears as a reset pulse on the RS output terminal and as shown in FIG. 9D. The next ten timing pulses are channeled through the steering circuit so that they appear as a group of ten units pulses on the UN output terminal as shown on FIG. 9B. The next, or twelfth timing pulse of FIG. 9A is channeled through the steering circuit and appears as a tens pulse on the TN output terminal as shown on FIG. 9C. The circuit operations continue in this manner with another group of ten units pulses next appearing on the UN terminal followed by a tens pulse on the TN terminal. After five groups of ten units pulses have appeared on the UN terminal, together with four tens pulses on the TN terminal, the next timing pulse is channeled through the steering circuit and appears as a reset pulse on the RS terminal as shown in FIG. 9D.

Referring to FIGS. 9B and 9E through 9H, it may be seen that the square wave pulse, shown on FIG. 9E, appears on units terminal U1 during the interval between the first and second units pulse on the UN terminal. Similarly, the square wave pulse shown on FIG. 9F appears on the units terminal U2 during the interval between the second and third units pulse on the UN terminal as shown on FIG. 9B. A similar relationship exists between the pulses appearing on the remaining ones of terminals U3 through U0 and the associated units pulses on the UN terminal as shown on FIG. 9B. The only exception to this is that the units 0 terminal has a square wave output applied thereto approximately twice as long as do terminals U1 through U9 since the output is applied to terminal U0 for the interval between the reception of the tenth units pulse on terminal UN and the reception of the first units pulse in the next group. This is shown on FIGS. 9B and 9H.

A similar relationship exists between the output pulses on the TN terminal and those on the individual tens output terminals T0 through T4 as shown on FIGS. 9C and 9I through 9M. For example, a positive potential appears on the tens output terminal T0 until the time the first tens output pulse appears on TN terminal as shown in FIG. 9C. Next, an output potential appears on the tens terminal T1 during the interval between the reception of the first and second tens pulses on the TN output terminal. Similarly, the tens output terminals T2, T3, and T4 as shown on FIGS. 9K, 9L, and 9M have an output potential on them during the interval between the reception of the associated tens pulses on the TN output terminal of FIG. 9C.

The pulses from the scanner pulse generator perform a plurality of functions. First of all, the units pulses on the UN terminal drive flip-flops 4–U0 through 4–U9 which together comprise the units decade of a two order counter in the central office. Secondly, the tens pulses on the TN terminal drive flip-flops 1–T0 through 1–T4 which together comprise the tens decade of the same counter. It is assumed that there are fifty lines under observation at the central office, therefore, this counter has a count capacity of fifty with each operative position thereof being individually associated with one of the lines under observation. Thirdly, the pulses appearing on the units terminals U0 through U9, together with the tens pulses appearing on the tens terminals T0 through T4, drive the matrix shown on FIGS. 2, 3 and 3A. This matrix has an individual line scanning gate and line test gate for each of the lines under observation.

The reset pulse appearing on the RS terminal is selectively applied to various parts of the circuit to reset the flip-flop circuits at appropriate times.

The units pulses on the UN terminal of the scanner pulse generator, as well as the tens pulses on the TN terminal, are transmitted over the signaling trunks, as later described, to the answering service center where they operate a flip-flop counter in synchronism with the counter at the central office. The reset pulse is also transmitted to the answering service center to reset various flip-flop circuits thereat at appropriate times.

The operation of the central office counter circuit is described most easily if it is assumed that the first pulse is a reset pulse as shown in FIG. 9D. Immediately prior to the reception of this pulse the counter is in its position 40 with flip-flops 1–T4 and 4–U0 on. This reset pulse appears on terminal 1–108 and is applied to the input of gate 1–C–2. Since the flip-flop which controls this gate, flip-flop 1–C, is in an off position, the gate is enabled and thus, the pulse passes therethrough to the input of gate 1–RRH. This gate is enabled since its control lead is at −6 volts through resistor 4–R2 and, therefore, the reset pulse passes through it to the input of pulse amplifier 1–103. The pulse is amplified therein and applied over lead 1–109, through a .01 mfd. condenser through diode 1–D1 and its associated resistor, to the set lead of flip-flop 1–T0 to turn it on. The pulse on lead 109 is also applied through diode 4–D3 to the set lead of flip-flop 4–U0. Flip-flop 4–U0 should normally be unaffected by this pulse since it should be in an on condition prior to the reception of the pulse. The pulse at the output of amplifier 1–103 is also applied to the input of resert amplifier 1–104 where it is amplified and applied over lead 1–110 to the common reset (CR) terminals of flip-flops 1–T1 through 1–T4 and 4–U1 through 4–U9, thereby resetting any operated ones of these flip-flops to their off condition. The output pulse from reset amplifier 1–104 is also applied to the CR terminal flip-flop 1–RH whose operation is of no concern at this point.

The central office counter is now in its position 00 with flip-flops 1–T0 and 4–U0 in their on or set condition. The next output pulse from the scanner pulse generator appears as a units pulse on terminal UN, as shown on FIG. 9B, and also appears as an individual units pulse on terminal U1, as shown on FIG. 9E. The latter pulse will be disregarded for the time being.

The first pulse on terminal UN is applied over lead 1–UN, through gate 4–RH–2 enabled, through gate 4–U0–1 enabled, since its controlling flip-flop is in a set condition, to the set lead of flip-flop 4–U1 to turn it on. The operation of flip-flop 4–U1 produces a positive pulse on its output lead which is applied to the control lead of gate 4–U1–1, thereby enabling it. The output pulse from flip-flop 4–U1 is also applied to the reset terminal of flip-flop 4–U0 to reset it. The next units pulse on lead 1–UN passes through gate 4–RH–2 enabled, through gate 4–U1–1 enabled, to the set lead of flip-flop 4–U2 to turn it on. The positive pulse appearing on the output lead as this flip-flop resets flip-flop 4–U1 and enables gate 4–U2–1 in series with the set lead of flip-flop 4–U3 (not shown).

The next six pulses applied to lead 1–UN pass through gate 4–RH–2 enabled and successively operate flip-flops 4–U3 through 4–U8. The operation of flip-flop 4–U8 enables gate 4–U8–1 and resets flip-flop 4–U7. The next pulse on lead 1–UN passes through gate 4–RH–2, through gate 4–U8–1, to the set lead of flip-flop 4–U9 to turn it on. The setting of this flip-flop resets flip-flop 4–U8 and enables gate 4–U9–1 in the set lead for flip-flop 4–U0. The next pulse on lead 1–UN (the tenth pulse from the left in FIG. 9B) passes through gates 4–RH–2 and 4–U9–1 to set flip-flop 4–U0. Operation of this flip-flop resets flip-flop 4–U9 and enables gate 4–U0–1.

Pausing for a moment, it may be seen that ten pulses have now been applied to lead 1–UN (the left-hand group of ten pulses in FIG. 9B) and that these pulses have passed through gate 4–RH–2 and advanced the units counters from position 4–U0 through 4–U9 and back to 4–U0.

The next pulse generated by scanner pulse generator 1–101 is a tens pulse which is applied to its terminal TN. This pulse is shown as the leftmost pulse in FIG. 9C. This pulse passes through gate 1–RH–1 enabled, through gate 1–T0–1 enabled since its controlling flip-flop is on, to the set lead of flip-flop 1–T1 to turn it on. The operation of flip-flop 1–T1 resets flip-flop 1–T0 and enables gate 1–T1–1. Next, ten additional pulses are applied to lead 1–UN before a second tens pulse is applied to terminal TN. These ten units pulses advance the units order flip-flops from position 4–U0 to 4–U9 and then back to 4–U0 in the same manner as did the first group of ten unit pulses.

Next, a second tens pulse is applied by the scanner pulse generator to terminal TN. This pulse passes through gate 1–RH–1 and 1–T1–1 to set flip-flop 1–T2. The operation of this flip-flop resets flip-flop 1–T1 and enables gate 1–T2–1 in the set lead of flip-flop 1–T3.

The circuit operation continues in a manner similar to that already described with each group of ten units pulses advancing the units counter a complete cycle while the tens pulse generated between each group of ten units pulses advances the tens counter one position. The operation continues in this manner until the counter circuit is in its position 49 with flip-flops 1–T4 and 4–U9 on. The next units pulse on lead 1–UN passes through gates 4–RH–2, 4–U9–1, to turn flip-flop 4–U0 on. The setting of flip-flop 4–U0 resets flip-flop 4–U9. The pulse which just turned flip-flop 4–U0 on is shown as the rightmost pulse on FIG. 9B.

The next pulse generated by the scanner pulse generator is the right-hand reset pulse shown on FIG. 9D. This pulse appears on terminal 1–108 and passes through gates 1–C–2 and 1–RRH both enabled, through pulse amplifier 1–103 where it is amplified and then applied over conductor 1–109 to set flip-flops 1–T0 and 4–U0. It has already been described how flip-flop 4–U0 would normally already be set at this time. However, this reset pulse is nevertheless applied to the set lead of this flip-flop so that in the event of a trouble condition it will always be set after the transmission of the reset pulse. The reset pulse is also applied to and amplified in reset amplifier 1–104 from which it is applied over conductor 1–110 to the common reset terminals of flip-flops 1–T1 through 1–T4 and 4–U1 through 4–U9 to reset them. The reset pulse from amplifier 1–104 is also applied to the common reset terminal of flip-flop 1–RH to reset it in the event that it had been operated.

The counter circuit is once again in its position 00 and, upon the reception of the next five groups of ten units pulses and the next four tens pulses, will once more proceed to advance from its position 00 through 49 and then back again to 00 as has just been described.

The reset pulse appearing on terminal RS, the units pulses on terminal UN, together with the tens pulses on terminal TN are all transmitted over the signaling trunks to maintain the counter comprising flip-flops 5–U0 through 5–U9 and 5–T0 through 5–T4 in synchronism with the central office counter. The counter at the answering service center is similar to the one at the central office, both circuitwise and in the fact that it has an operative position for each line under observation at the central office. Thus, proceeding with our assumption that there are fifty lines under observation at the central office, there are fifty positions on the counter shown on FIG. 5 just as there are fifty positions on the counter shown on FIGS. 1 and 4 whose operation has already been described.

The first reset pulse shown on FIG. 9D is applied over conductor 1–RS, through gate 4–RBK–1, transmitting amplifier 4–101, transformer 4–104, over signaling trunk 4–109, transformer 4–106, receiving amplifier 5–100, to terminal 5–105. From there, the reset pulse is applied through a resistor and diode 5–D1 to the set lead of flip-flop 5–T0 to turn it on. The setting of flip-flop 5–T0 enables gate 5–T0–1 in the set lead of flip-flop 5–T1. The reset pulse on terminal 5–105 is also applied through a resistor and diode 5–D2 to set flip-flop 5–U0 which, in turn, enables gate 5–U0–1. However, flip-flop 5–U0 should already have been on at this time as well as flip-flop 4–U0. The reset pulse appearing on terminal 5–105 is also applied to and amplified by reset amplifier 5–106 which, in turn, applies the amplified reset pulse to the common reset (CR) terminal of flip-flops 5–T1 through 5–T4, 5–U1 through 5–U9, as well as to the CR terminals of all the flip-flops shown on FIG. 6. Thus, the first reset pulse shown on FIG. 9D resets the counter of FIG. 5 to its position 00 in the same manner that the counter shown on FIGS. 1 and 4 is set to its position 00 by the same reset pulse.

The first units pulse appearing on the UN terminal is applied over lead 1–UN, through transmitting amplifier 4–102, transformer 4–104, signaling trunk 4–109, transformer 4–106, receiving amplifier 5–101 where the pulse is amplified and then applied to the input of gates 5–U9–1, and 5–U0–1 through 5–U8–1. Recalling that only flip-flop 5–U0 is set at this time, only gate 5–U0–1 will be enabled and thus, the first units pulse will pass only through this gate to the set lead of flip-flop 5–U1, thereby turning it on. The setting of flip-flop 5–U1 resets flip-flop 5–U0 and enables gate 5–U1–1 in the set lead for flip-flop 5–U2. In a similar manner, the remaining nine units pulses in the first group of ten units pulses, as shown on FIG. 9B, are transmitted to the answering service center where they advance the units flip-flops from positions 5–U2 through 5–U9 and then back to 5–U0 in synchronism with the operation of flip-flops 4–U0 through 4–U9 as has already been described.

Next, the leftmost tens pulse appearing on terminal TN of the scanner pulse generator as shown on FIG. 9C, is applied over lead 1–TN, through diode 4–D2, transmitting amplifier 4–103, transformer 4–105, signaling trunk pair 4–110, transformer 4–107, transmitting amplifier 5–102, where it is amplified and applied through gate 5–T0–1 enabled to the set lead of flip-flop 5–T1 to turn it on. The setting of flip-flop 5–T1 resets flip-flop 5–T0 and enables gate 5–T1–1 in the set lead of flip-flop 5–T2.

Next, the second group of ten units pulses are applied to terminal UN of the scanner pulse generator and transmitted to the answering service center where they advance the units flip-flops from position 5–U0 through 5–U9 and then back again to 5–U0. Following this, the second tens pulse is transmitted to the answering service center where it advances the tens counter from flip-flop 5–T1 to 5–T2.

The operation continues in a similar manner upon the reception of the remaining pulses with the flip-flop counters at the answering service center remaining in synchronism with the counter at the central office.

Referring back to the equipment at the central office and in particular to that shown on FIGS. 2 and 3, it is seen that these figures contain fifty line test gates, elements 2–00, 2–01 through 3A–49, with each gate being connected to and individually associated with one of the lines 00 through 49 under observation. Each gate, such as, for example, line gate 3–02, contains resistors 3–R1, 3–R2, 3–R3, condensers 3–C1 and 3–C2, and diodes 3–D1 and 3–D2. This circuit configuration is connected over cable 1–114 to the ring conductor of line 02. During the silent (non-ringing) intervals of the line, the left-hand terminal of diode 3–D1 is back biased by the −24 volt potential through resistors 3–R2 and 3–R1 since the right-hand side of the diode is connected to ground over conductor 2–100 and resistor 4–R1. During the ringing intervals, ringing current flows through resistor 3–R3, diode 3–D2, and condenser 3–C2 in series. The rectifying action of diode 3–D2 charges condenser 3–C2 positively a sufficient amount so that the left-hand terminal of diode 3–D1 is only back biased a volt or less with respect to its right-hand terminal. Thus, in summary so far, it may be seen that diode 3–D1 is back biased by 24 volts during the silent intervals on the line and back biased by only one volt or less during the ringing intervals.

On FIGS. 9I through 9M, it is seen that a positive potential appears on the tens output terminal T0 of the scanner pulse generator during the entire time that the first group of ten units pulses are applied to terminal UN. Similarly, a positive potential is applied to terminals T1 through T4, respectively, during the entire time that the second, third, fourth, and fifth groups of ten units pulses, respectively, are applied to terminal UN. Also, referring to FIGS. 9E through 9H, it is seen that a positive potential is applied to units terminal U0 through U9 and back to U0 momentarily and consecutively once during the application of each group of ten units pulses to the UN terminal.

A positive potential is applied to terminal T0 when counter 1–T0 is set by the reset pulse. This potential on terminal T0 is applied over cable 1–113 to the control lead of gates 2–LS00, 2–LS01, 3–LS02 through 3A–LS09, thereby enabling them during the time that the first group of ten units pulses is applied to terminal UN of the scanner pulse generator. As may be seen from FIG. 9H, counter 4–U0 is set one time slot before the reset pulse and therefore, a positive potential is on units terminal U0 shortly before counter 1–T0 is set by the reset pulse. The potential on terminal U0 is applied over cable 1–112 to the input of gate 2–LS00 as well as the input of gates 2–LS10, 2–LS20, 2–LS30 and 2–LS40. Remembering that only gate 2–LS00 of this group of gates is enabled when counter 1–T0 is set, the positive potential from the units U0 terminal would pass through this gate if it had first been applied shortly after, rather than before, the potential was applied to terminal T0. However, it does not pass through gate 2–LS00 since, being applied one timing pulse of FIG. 9A earlier than the time the potential appears on terminal T0, it is fully differentiated by the input circuit of the gate by the time the gate is enabled by the potential from T0.

The circuit details of gate 2–LS00 are shown in FIG. 8A. Condenser 8–C1 and resistor 8–R1 differentiate the input potential from counter 4–U0 when it is first applied to the gate. At the time this differentiation is going on, flip-flop 1–T4 is still in a conducting position, flip-flop 1–T0 has not yet been set, and therefore gate 2–LS00 is not yet enabled from the output of flip-flop 1–T0. Therefore, the differentiated pulse from terminal U0 does not pass through the gate since it is not enabled at this time. As a result, when the output of flip-flop 1–T0 is applied to the input of gate 2–LS00 during the interval between the reception of the reset pulse which sets flip-flop 1–T0 and the reception of the first pulse on the UN terminal, no pulse is transmitted through gate 2–LS00.

The next pulse appearing on the UN terminal advances the units counters to position 4–U1 and at the same time applies a positive pulse to units terminal U1. The pulse on terminal U1 is applied over conductor 1–112 to the inputs of all of gates 2–LS01, 2–LS11, 2–LS21, 2–LS31, and 2–LS41. Of these, only gate 2–LS01 is enabled at this time since it is the only one that has an enabling potential on its control lead from flip-flop 1–T0 which, as will be recalled, remains operated during the reception of the first group of ten pulses on the UN terminal. Similarly, the next units pulse on the UN terminal advances the units counter to flip-flop 4–U2 and concurrently therewith removes the potential from units terminal U1 and applies it to units terminal U2. The potential now on terminal U2 is applied over conductor 1–112 to the input of gate 3–LS02 as well as the other gates in the same horizontal row on FIG. 3. Of these, only gate 3–LS02 is enabled by flip-flop 1–T0 and therefore the pulse on terminal U2 only passes through gate 3–LS02. After passing through this gate, it passes to the input of gate 3–02. If line 02 is in a ringing condition the back bias on diode 3–D1 will be removed and the input pulse from gate 3–LS02 will pass through condenser 3–C1, and diode 3–D1 since the pulse is of sufficient amplitude to overcome the negligible back bias on diode 3–D1 at this time. From diode 3–D1 the pulse passes over conductor 2–100, terminal 2–101, transmitting amplifier 4–115, transformer 4–105, trunk pair 4–110, transformer 4–107, receiving amplifier 4–103 to conductor 5–107. This pulse may be termed a ringing pulse since it is transmitted to the answering service center only during the times that a ringing condition is on the observed line associated therewith. The ringing pulse on conductor 5–107 is applied to the input of gates 6–T0 through 6–T4.

Reviewing the circuit action just described, it may be seen that, if ringing potential is on line 02 at the time that the outputs from terminals T0 and U2 of the scanner pulse generator are applied to gate 3–LS02, a pulse manifesting the ringing condition of this line is passed through gate 3–02 and transmitted to the answering service center. A ringing potential on any of the other of lines 00, 01, 03 through 49 at this time would have no effect on the circuit since none of the gates 2–LS00, 2–LS01, 3–LS03 through 3–LS49 can pass a pulse from the scanner pulse generator to the corresponding ones of line test gates 2–00, 2–01, 3–03 through 3–49. In other words, if a ringing potential is applied to line 02 during the time an output potential is applied to both terminals T0 and U2 of the scanner pulse generator, a ringing pulse will be transmitted to the answering service center regardless of the ringing or non-ringing condition of any of the other lines. The converse is also true. If ringing potential is not applied to line 02 at this time, no ringing pulse will be transmitted to the answering service center regardless of the ringing or non-ringing condition on any other lines.

Referring to FIGS. 9F, 9G, and 9I, it may be seen that the positive potential remains on terminal T0 of the scanner pulse generator while a positive pulse appears on terminal U3 following the removal of the positive pulse from terminal U2. The positive potential remaining on terminal T0 leaves all of gates 2–LS00 through 3–LS09 in an enabled condition. The pulse applied to terminal U3 travels through cable 1–112 and is applied to the input terminal of all of gates 3–LS03, 3–LS13, 3–LS23, 3–LS33, and 3–LS43. Of this latter group of gates, only gate 3–LS03 is enabled by the output from T0 and thus, the U3 pulse can pass only through gate 3–LS03 to the input of line test gate 3–03. If, at this time, ringing potential is applied to line 03, gate 3–03 will be back biased only a slight amount and, therefore, a ringing pulse will be transmitted to the answering service center in a manner similar to that already described in connection with line 02. Also, if at this time no ringing potential is applied to line 03, gate 3–03 will be heavily back biased, thereby blocking the passage of the pulse from gate 3–LS03 and preventing the transmission of a ringing pulse to the answering service center.

The circuit operations continue in this manner with gates 3–LS04, 3–04 through 3–LS49 and 3A–49 being consecutively enabled to effect the transmission of a ringing pulse to the answering service center at the appropriate time in the event that the observed lines associated therewith have ringing potential on them.

The counter at the answering service center drives the matrix circuit shown on FIG. 6 which contains a gate and a flip-flop individual to each of the fifty counter positions and likewise, individual to each of the fifty lines under observation in the central office. The matrix circuit works in such a manner that upon the reception of a ringing pulse on conductor 5–107, the pulse is passed through the circuitry of FIG. 6 to set the flip-flop associated with the observed line represented by the pulse. Each flip-flop when set, energizes a signal means, such as, for example, a light which can be observed by an operator.

Gates 6–T0 through 6–T4 on the top of FIG. 6 are each connected to individual flip-flops in the tens order of the counter and each is enabled when its corresponding flip-flop is in a set condition. For example, the control lead of gate 6–T0 is connected over cable 5–108 to the output terminal of flip-flop 5–T0. This flip-flop remains set during the entire time the counter advances from position 00 through 09 and 00 and, therefore, the potential on its output terminal at this time maintains gate 6–T0 enabled. Similarly, flip-flop 5–T1 is set while the counter advances from positions 10 through 19 and 10 and, therefore, gate 6–T1 is enabled during this interval.

The output terminal of each flip-flop in the units order of the counter is connected over cable 5–109 to the control leads of an individual row or gates on FIG. 6. For example, the output of flip-flop 5–U0 is connected over cable 5–109 to the control leads of gates 6–00, 6–10, 6–20, 6–30, and 6–40. Similarly, the output of flip-flop 5–U9 is connected to the control leads of gates 6–09, 6–19, 6–29, 6–39 and 6–49.

The operation of the circuit on FIG. 6 is such that a particular one of gates 6–T0 through 6–T4 is always enabled as determined by the set flip-flop in the tens order of the counter. The enabled one of gates 6–T0 through 6–T4 allows any ringing pulse on conductor 5–107 to pass through the one enabled gate to the input of the ten gates associated therewith. For example, continuing with our assumption that a call is received on observed line 02 at the central office, the ringing pulse will arrive at the central office and appear on conductor 5–107 at the time both the counters at the central office and answering service are in their operative position 02. At this time the output from flip-flop 5–T0 is applied through cable 5–108 to the control lead of gate 6–T0 thereby enabling it. The enabling of this gate allows the ringing pulse on conductor 5–107 to pass therethrough to conductor 6–100 and then to the input leads of the ten gates, 6–00 through 6–09, connected to this conductor.

An inspection of FIG. 6 shows that there is a slip of one, or, a difference of one between each flip-flop, such as for example, 6–L02 and the gate which permits the passage of a ringing pulse to the flip-flop. Specifically, gate 6–01 must be enabled when the ringing pulse for line 02 passes from conductor 5–107, through gate 6–T0, to set flip-flop 6–L02. The reason that flip-flop 6–L02 rather than 6–L01 is associated with gate 6–01 concerns the circuit subtleties of the gate used in the present system.

Referring to FIG. 8A where the circuit details of the enabling gates are shown, it is seen that the left-hand side of diode 8–D1 must be at −6 volts in order for any positive going input signal to pass through the diode. The controlling potentials which determine whether the gate is to be inhibited or enabled are applied to the left-hand side of the diode through resistor 8–R1. Considering for a moment the time when the gate is inhibited, the −24 volt potential is applied through resistor 8–R1 thereby back biasing the diode approximately 18 volts by virtue of the −6 volt potential applied to its right-hand terminal by resistor 8–R2. The transferring of the gate from its inhibited to its enabled condition requires the raising of the control lead from −24 to −6 volts. This controlling potential is normally applied from the output of a flip-flop and comprises a positive pulse of the type shown in FIG. 9E. However, the abrupt switching of the control lead from −24 to −6 volts by the associated flip-flops set does not instantaneously raise the potential on the left-hand side of diode 8–D1 due to the time required for condenser 8–C1 to charge as determined by the RC time constant of condenser 8–C1, resistor 8–R1 and the resistance associated with the output lead of the flip-flop to which the gate it connected. In other words, although a pulse having a short rise time may raise the potential of the control lead from −24 to −6 volts instantaneously in so far as present considerations are concerned, the potential rise on the left-hand side of diode 8–D1 is not nearly as fast and is delayed a considerable time as determined by the RC time constant of the charge and discharge path of condenser 8–C1. Also, the switching of the gate from its enabled condition with −6 volts on the left-hand side of the diode to its off condition with −24 volts on the same terminal of the diode cannot be done instantaneously, but again requires a finite amount of time as required by the RC time constant of the charge and discharge path of condenser 8–C1.

Briefly summarizing, the gates used in the present system cannot be switched from one condition to another instantaneously but, instead require a finite amount of time to make this transition. This transition time will be, for ease of discussion, hereinafter referred to as the delay time of the gate.

The easiest way to explain the effect the delay time of the gate has upon the circuit of FIG. 6 is in connection with a given position of the counters. Let it be assumed that the counters in both the central office and the answering service center are in their position 01. When the counter at the answering service center is in position 01, gate 6–T0 is enabled from the output of flip-flop 5–T0 which remains in its set position during the entire length of time that the units order of the counter is completing its first cycle. Gate 6–01 is enabled when the counter is in its position 01 from the output of flip-flop 5–U1. The next output pulse of the scanner pulse generator is applied to conductor 1–UN and transmitted to the answering service center to advance the units order of the counter from flip-flop 5–U1 to flip-flop 5–U2. Coincidentally with the transmission of this pulse to the answering service center, a pulse is applied from terminal U2 of the scanner pulse generator over conductor 1–112 and through gate 3–LS02 which is enabled at this time under control of the flip-flop 1–T0. If, at this time, ringing potential is being applied to line 02, gate 3–02 allows the pulse from gate 2–LS02 to pass through to conductor 2–100 and then over circuits previously described, to conductor 5–107 in the answering service center. The pulse on this conductor arrives thereat at the same time that the units pulse arrives to set flip-flop 5–U2 and reset flip-flop 5–U1. Since gate 6–T0 is enabled for all of positions 01 through 09 and 00 of the counter, it is enabled at this time and the pulse on conductor 5–107 passes through gate 6–T0 and appears on conductor 6–100. Remembering that the units order counters are advancing from position 5–U1 to 5–U2 at the exact instant of time that the ring pulse appears on conductor 6–100, it may be seen that, due to the delay time of the gates, gate 6–01 will remain enabled a finite period of time after the counter advances from position 01 to 02 and also, gate 6–02 will not be enabled until a finite period of time after the counter has assumed its position 02. Therefore, the ringing pulse for line 02 now appearing on conductor 6–100 will pass through gate 6–01 rather than 6–02. Thus, since the ring pulse for line 02 passes through gate 6–01, the flip-flop 6–L02 for line 02 must be connected to gate 6–01.

The ringing pulse on the set lead of flip-flop 6–L02 turns it on. The flip-flop in turning on energizes a signal lamp from its BU output terminal to notify the attending operator that line 02 is now being rung.

Circuit operations continue in this manner whereby during each scan a ringing pulse is transmitted to the answering service center for each observed line in a ringing condition at the time. The receipt of each pulse effects the operation of its associated flip-flop in a manner similar to that already described, thereby lighting a display lamp to signify a ringing condition of its associated line.

When the operator desires to answer a call she momentarily depresses key 6–110 in the position associated with the line being called, inserts her cord in a selected trunk jack, and operates key 5–CON. The operation of key 5–CON applies a ground through transformer 5–110, over trunk pair 4–108, through the lower winding of transformer 1–102, to operate relays 1–S and 1–CON in series. The operation of relay 1–CON closes its make contacts shown on FIGS. 1 and 7.

The make contacts of relay 1–CON on FIG. 1 are designated 1(1–CON) with the designation inside the parentheses serving to indicate the particular relay with which the contacts are associated. The closure of these contacts applies −6 volts to the control leads of gates 1–106 and 1–107. This potential inhibits gate 1–106 thereby preventing any pulses from the TP terminal of the scanner pulse generator from being applied to and resetting flip-flop 1–C. The application of this control potential to the control lead of gate 1–107, enables it in order that flip-flop 1–C may be set in a manner about to be described.

It has already been mentioned how the operator momentarily depresses switch 6–110 to its position 02 in order to answer a call appearing on line 02. After this switch is depressed and on the next scan, the ringing pulse appearing on conductor 5–107 and representing the ringing condition of line 02 passes through gates 6–T0 and 6–01 in a manner hereinbefore described and is then applied to position 02 of the switch. Since the switch is depressed in its position 02, the pulse passes therethrough over conductor 6–111, through transmitting amplifier 5–104, transformer 4–113, trunk pair 4–111, transformer 4–112, receiving amplifier 1–105, gate 1–107 enabled, to the set lead of flip-flop 1–C.

The setting of flip-flop 1–C operates relay 1–C from its BU output terminal and from its other output terminal sets flip-flop 1–RH. The setting of flip-flop 1–RH inhibits gates 1–RH–1 and 4–RH–2 which, in turn prevent any additional tens or units pulses from being applied to the counter, thereby blocking it in the operative position associated with line 02 now being called. The setting of flip-flop 1–C also inhibits gate 1–C–2 thereby preventing any further reset pulses from being applied to gate 1–RRH and amplifier 1–103.

The operation of relay 1–C closes its make contacts 1(1–C) which applies −24 volts to the lower winding terminal of relays 1–T0 through 1–T4 and 4–U0 through 4–U9. Of these, only relays 1–T0 and 4–U2 operate at this time inasmuch as only the flip-flops associated with these two relays are set at this time. The closure of contacts 1(1–C) also inhibits gate 1–RRH.

Figure 7:
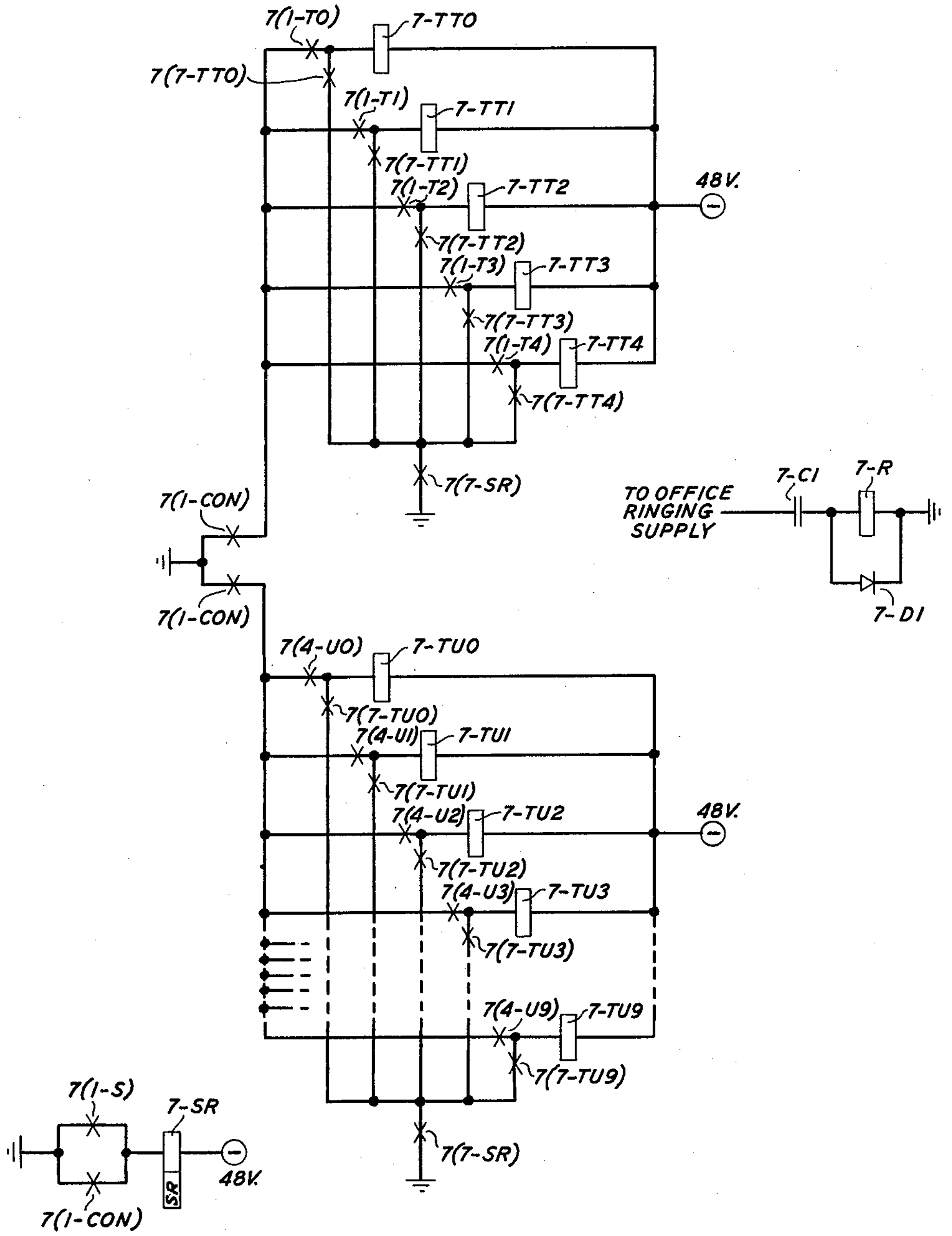

The operation of relay 1–CON together with relays 1–T0 and 4–U2 closes a path on FIG. 7 to operate relays 7–TT0 and 7–TU2. The path to operate relay 7–TT0 extends from ground through make contacts 7(1–CON), make contacts 7(1–T0) to the winding of relay 7–TT0. The path to operate relay 7–TU2 extends from ground on make contacts 7(1–CON) through make contacts 7(4–U2) to the winding of relay 7–TU2. Relay 7–TT0 in operating, closes a locking path for itself through its make contacts 7(7–TT0) to ground on make contacts 7(7–SR). Relay 7–SR is operated at this time over an obvious path by the closure of make contacts on relays 1–S and 1–CON. The operation of relay 7–TU2 closes a locking path for itself over its make contacts 7(7–TU2) to ground on make contacts 7(7–SR). The operation of relay 7–TT0 and 7–TU2 together close their make contacts shown in the upper left-hand corner of FIG. 1 to establish a path through the relay tree and interconnect the talking trunk 4–108 and transformer 1–102 with line 02 now being called.

The operator releases her key 5–CON and switch 6–110 when she ascertains that the connection has been established with the called line. The release of key 5–CON removes ground from the loop thereby releasing relay 1–CON. Relay 1–S remains operated over the closed loop. Relay 7–SR remains operated upon the release of relay 1–CON over contacts 7(1–S). Relay 7–SR operated holds relay 7–TT0 and 7–TU2 operated. The operator may now converse with the calling party and the connection is held until the operator removes her cord from jack 5–111.

The release of relay 1–CON opens its make contact 1(1–CON), thereby enabling gate 1–106 and inhibiting gate 1–107. The enabling of gate 1–106 allows the next pulse on the TP terminal of the scanner pulse generator to reset flip-flop 1–C. Relay 1–C releases as its associated flip-flop is reset. The release of relay 1–C opens its make contacts 1(1–C) in the holding circuit for relays 1–T0 and 4–U2 thereby allowing them to release. The opening of make contacts 1(1–C) also enables gate 1–RRH thereby permitting flip-flop 1–RH and the counter flip-flops to be reset by the next reset pulse. The reset of flip-flop 1–RH enables gates 1–RH–1 and 2–RH–2 thereby permitting the central office counter to resume its operation upon the reception of the succeeding pulses.

At this time the operator is connected to and may converse with the party now calling line 02. The connection between the talking trunk and line 02 remains held by relays 7–TT0 and 7–TU2 which remain operated over the previously described locking path provided by the make contacts of relay 7–SR which in turn remains operated as long as relay 1–S is held operated. The line scanning at the central office and the display of the ringing condition of any observed lines at the answering service center continues even though the operator is now connected to the party calling line 02.

Once the operator has ascertained the nature of the call and has finished her conversation, she removes her cord circuit from jack 5–111 of the talking trunk thereby breaking the closed loop and releasing relay 1–S. The release of this relay opens its make contacts 7(1–S) which in turn opens the circuit for relay 7–SR thereby allowing it to release. The release of relay 7–SR effects the release of relays 7–TT0 and 7–TU2 thereby returning the entire circuit to its enabled condition. The operator is now free to answer calls on any other line.

The preceding circuit description and the drawings show only one talking trunk, 4–108, interconnecting a central office and the answering service center. This one talking trunk permits an operator at the answering service center to answer only one call at a time in the central office in which the equipment shown in FIGS. 1 through 4 and 7 would be located. If, due to heavy incoming traffic in this particular office, the load becomes too heavy for one operator to handle, additional talking trunks similar to 4–108, together with additional central office trunk circuits, as desired may be added between this central office and the answering service center. Each additional talking trunk wil permit additional operators at the answering service center to answer other calls incoming to this office while another operator is conversing with the party associated with an earlier incoming call.

For example, assume that one such additional talking trunk is provided and that a call is first incoming to line 02 and then a short while later is incoming to line 15. In this case, when a first operator answers the call incoming to line 02 she depresses switch 6–110 to its position 02 and interconnects her cord circuit with talking trunk 4–108 to effect the desired interconnection with line 02 as previously described. Once this interconnection has been established, a second operator, observing that a call is currently being directed to line 15, depresses switch 6–110 to its position 15 and connects her cord circuit to the second talking trunk. She will then be interconnected with line 15 in a similar manner that the first operator was connected with line 02. The grounds supplied by make contact 5–CON in each cord circuit would, in this case, be supplied by a series preference circuit comprising the make contacts 5–CON in each cord circuit.

It is well known that the ringing current is applied to a called line in an intermittent manner such as, for example, two seconds of ringing followed by a four-second silent interval followed once again by a two-second ringing interval and so on. Provision is made in the present circuit whereby once a flip-flop on FIG. 6 is set during a particular scan, it will not be reset until the termination of the two-second ringing interval. This is accomplished by not transmitting reset pulses to the answering center during the ringing interval. The central office equipment scans the observed lines at a rate of approximately 250 lines a second or one line every four milliseconds. Therefore, if reset pulses were received at the answering center during the ringing intervals, a flip-flop on FIG. 6 associated with a line currently being called could be set at the beginning of the two-second interval and would be reset by the reset pulse a few milliseconds later before the operator could have a chance to observe the call.

The equipment which prevents the transmission of the reset pulse at this time is under control of relay 7–R which is connected to the office ringing supply through condenser 7–C1 and diode 7–D1 in such a manner that relay 7–R operates on the initiation of the two-second ringing period and releases at the termination thereof. The operation of relay 7–R closes its contacts 4(7–R) which in turn enables gate 4-117 and inhibits gate 4–116. The enabling of gate 4–117 allows the next pulse appearing on the TP terminal of the scanner pulse generator to set flip-flop 4–RBK. The setting of this flip-flop in turn enables gate 4–RBK–2 and inhibits gate 4–RBK–1. Both of these latter two gates have their inputs connected to conductor 1–RS to which the reset pulse from the scanner pulse generator is applied. The inhibiting of gate 4–RBK–1 during the ringing interval prevents any reset pulse from passing therethrough for transmission to the answering service center. The enabling of gate 4–RBK–2 applies the next reset pulse to conductor 1–TN to which conductor is normally applied the tens pulses from the scanner pulse generator.

Referring to FIGS. 9C and 9D it is seen that there are only four tens pulses on FIG. 9C and that the reset pulse of FIG. 9D may be said to comprise the fifth tens pulse since it sets the tens counter to its position 0. Therefore, the passage of the reset pulse through gate 4–RBK–2 to the input of amplifier 4–103 for transmission to the answering service center allows the tens counter to advance to position 0 at the end of a scan in the same manner that it would upon the reception of the reset pulse. Specifically, with flip-flop 5–T4 set at the end of the scan, it makes no difference to flip-flop 5–T0 whether the pulse to set it is a reset pulse through diode 5–D1 or an inserted tens pulse through gate 5–T4–1 since the flip-flop is set in any event. Thus, it may be seen that the blocking of the reset pulse from the reset circuits in the answering center during the ringing interval and the application of this pulse to the tens input lead keeps the answering service counter in synchronism with the central office counter and, at the same time, prevents the reset of any flip-flop on FIG. 6 which operated during the same ringing interval.

At the end of the ringing interval relay 7–R releases thereby releasing its contacts 4(7–R). The opening of these contacts inhibits gate 4–117 and enables gate 4–116. The enabling of this latter gate allows the next pulse on the TP terminal to reset flip-flop 4–RBK. The resetting of this flip-flop inhibits gate 4–RBK–2 and enables gate 4–RBK–1 thereby allowing the next reset pulse to be applied in the usual manner.

Although it has not been specifically stated, it should be obvious that the system disclosed on FIGS. 1 through 7 comprises the equipment necessary to enable the answering service center to monitor the condition of a plurality of lines in only a single office. In its commercial embodiment, the answering center would normally be arranged to monitor lines in a plurality of offices and would be provided with a seperate and individual circuit for each office having lines to be monitored. Thus, for example, if an answering center is to monitor lines in ten different offices, it would require ten of the circuits disclosed herein, one for each office. This system also enables the operator to count the number of rings and avoid answering calls that may be answered by the party being called.

*Enabling gate (FIG. 8A)*

This figure discloses the functional representation as well as the circuit details of the enabling gates used extensively through this system. Referring to the functional representation, a positive going signal applied to the input lead will pass through to the output whenever a control signal of the required potential is applied to the control lead. A potential of less than the required amout on the control lead will cause the gate to become inhibited and act as an open circuit, thereby preventing any nput signals from passing to the output lead.

Referring to the lower portion of FIG. 8A, it is seen that the gate is in an on or enabled condition when a −6 volts is applied to the control lead and is in an off or inhibited condition when a −24 volts is applied to the control lead. In the on or enabled condition, the −6 volts applied to the control lead puts both sides of diode 8–D1 at the same direct current potential since −6 volts is also applied to the right-hand side of the diode through resistor 8–R2. Therefore, when positive going signals are applied to the left-hand side of the diode through condenser 8–C1, the diode will be biased in a forward direction, whereby enabling the signal to pass therethrough and appear on the output lead.

When the gate is inhibited, the diode is reverse-biased by 18 volts as the −24 volt potential is applied to the left-hand side through resistor 8–R1. In this condition, the diode will remain reverse-biased for all input signals having an amplitude of less than 18 volts and therefore it will act as an open circuit to signals of this magnitude. The control signals and pulses used throughout the present system all have an amplitude of less than 18 volts and therefore, they will be unable to pass through the gate when it is in its inhibited or off position.

*Inhibiting gate (FIG. 8B)*

This figure shows the functional representation as well as the circuit details of the inhibiting gates used throughout the present system. Referring to the functional representation of the gate, the purpose of this gate is to allow signals appearing on the input lead to pass through to the output lead when a potential of a first magnitude is applied to the control lead and to prevent the input signals from passing through to the output lead when a potential of a second magnitude is applied to the control lead.

The circuit of this gate is essentially the same as that of the enabling gate of FIG. 8A. Only the external connections are different. As shown on the lower portion of FIG. 8B, the application of −24 volts to the control lead causes the same potential to appear on both sides of diode 8–D11 by means of resistors 8–R11 and 8–R12. In this position any positive going signals appearing on the input lead will pass through condenser 8–C11, diode 8–D11 and will appear on the output lead. Conversely, the application of −6 volts to the control lead will cause the diode to be back biased 18 volts and thereby prevent any positive going signals of less than 18 volts in amplitude from passing through to the output lead.

*Scanner pulse generator and timing circuit (FIGS. 10 and 11)*

FIGS. 10 and 11 discloses the circuit details of the scanner pulse generator 1–101. As will be recalled, this circuit generates a plurality of different types of pulses as shown in FIGS. 9A through 9M for synchronizing and controlling the operation of the system. The output leads on FIGS. 10 and 11 are designated the same as the corresponding output leads of generator 1–101 on FIG. 1 for ease of comparison.

The controlling element of the scanner pulse generator circuit is the source of timing pulses 10–101. The output pulses from this source drive a chain of units counters 10–U0 through 10–U9 and a chain of tens counters 11–T0 through 11–T4 which together provide a means of counting up to 50 (00 through 49). The timing pulses from the output of source 10–101 are applied to terminal 10–103 and to the "timing pulse lead" TP which applies the timing pulses to the various parts of the system shown in FIGS. 1 and 4. The pulses on terminal 10–103 are also applied to enabling gate 10–UFF–2 and inhibiting gate 10–UFF–1.

Pulse source 10–101 is shown in diagrammatic form since it may be of any type suitable for the purpose. However, in keeping with the rest of the circuit, it would advantageously comprise a transistorized pulse geneartor of the type shown in detail in FIG. 15. The main requirement for this circuit is that it generate a continuous series of positive pulses of short duration and of the desired frequency as shown in FIG. 9A.

In describing the operation of the circuit of FIGS. 10 and 11, it will be assumed that both the tens and units counters have just been reset to their 0 position so that counters 10–U0 and 11–T0 are now on. Gates 10–U0–1 and 11–T0–1 are enabled at this time since their associated flip-flop counters are on. The next pulse applied to terminal 10–103 (the second pulse from the left in FIG. 9A) will pass through gate 10–UFF–1 enabled, to the input of the units pulse amplifier 10–102. The circuit details of this amplifier are shown in FIG. 12. After amplification, the pulse passes through enabled gate 10–U0–1 to the set lead of counter 10–U1 to turn it on. Counter 10–U1 in operating performs two functions. First, it applies a pulse from its output lead back to the reset lead of counter 10–U0 to turn it off. Second, it enables gate 10–U1–1 in the set lead of counter 10–U2. The next timing pulse applied to terminal 10–103 passes through gate 10–UFF–1 and amplifier 10–102, through gate 10–U1–1 to turn counter 10–U2 on. The operation of counter 10–U2 resets counter 10–U1 and prepares the circuit for the operation of counter 10–U3 (not shown) upon the reception of the next timing pulse.

The circuit operation continues in this manner with counters 10–U3 through 10–U9 being operated in succession upon the reception of additional timing pulses from source 10–101. Counter 10–U9 in operating resets counter 10–U8 and enables gate 10–U9–1 in series with the set lead for counter 10–U0. The next timing pulse passes through gate 10–U9–1 enabled to the set lead of counter 10–U0 to turn it on. The operation of this counter turns counter 10–U9 off and, in addition, applies a pulse through condenser 10–C1 to the set lead of flip-flop 10–UFF to turn it on. The operation of flip-flop 10–UFF applies a controlling potential over its output lead to inhibit gate 10–UFF–1 and enable gate 10–UFF–2.

Units pulse amplifier 10–102 applies an output pulse to the "units pulse" lead UN at the same time it applies each driving pulse to the unit counter chain 10–U0 through 10–U9. FIG. 9B shows the units pulses appearing on this lead together with their relationship with the timing pulses appearing on lead TP. Also, each of counters 10–U0 through 10–U9 when operated applies a positive pulse to the corresponding one of its output leads U0 through U9. The pulses applied to output leads U0 through U9 are shown on FIGS. 9E through 9H. It should be noticed that the units counter 10–U0 remains on for an appreciably longer time than do the other units counters.

The next timing pulse applied to terminal 10–103 is not applied to the units counter circuit since gate 10–UFF–1 is inhibited, but instead is applied through gate 10–UFF–2 enabled, terminal 11–105, through gate 11–T4–1 enabled (since counter 11–T4 is off at this time), to the input of the tens pulse amplifier 11–101, whose circuit details are shown on FIG. 12. After amplification the pulse passes through gate 11–T0–1 enabled to the set lead of counter 11–T1 to turn it on. The operation of counter 11–T1 resets counter 11–T0 and enables gate 11–T1–1 in the set lead for counter 11–T2.

The driving pulses for the tens counter, as supplied by pulse amplifier 11–101, also appear on the "tens pulse lead" TN as shown on FIG. 9C. The output pulse from amplifier 11–101 is also applied to the reset lead of flip-flop 10–UFF to turn it off and thereby enable gate 10–UFF–1 and inhibit gate 10–UFF–2.

The next ten timing pulses appearing on terminals 10–103 pass through gate 10–UFF–1 enabled and amplifier 10–102 to advance the units counter chain one complete cycle from counter 10–U1 through 10–U9 and then back to counter 10–U0. The operation of counter 10–U0 again turns flip-flop 10–UFF on which, in turn, enables gate 10–UFF–2 and inhibits gate 10–UFF–1 so that the next timing pulse will pass through gates 10–UFF–2 and 11–T4–1 and advance the tens decade from counter 11–T1 to counter 11–T2.

The circuit operation continues in this manner with the units counter chain making a complete cycle of operation on ten timing pulses and then steering the eleventh timing pulse to the tens counter circuit to advance it one position.

Counter 11–T4 is on while the circuit is counting the digits 40 through 49. Counter 11–T4 in operating enables gate 11–T4–2 and inhibits gate 11–T4–1. During the time 11–T4 is on, the units counter chain advances from positions 10–U0 through 10–U9. After the counter has advanced to position 49, the next timing pulse passes through amplifier 10–102 to turn counter 10–U9 off and 10–U0 on. Counter 10–U0 in operating operates flip-flop 10–UFF to inhibit gate 10–UFF–1 and enable gate 10–UFF–2. The next timing pulse passes through gates 10–UFF–2 and 11–T4–2 to the input lead of pulse amplifier 11–106. The circuit details for this amplifier are shown on FIG. 12. Amplifier 11–106, in response to the receipt of this timing pulse, generates a pulse which is amplified by reset amplifier 11–RS1, whose circuit is shown on FIG. 13 and then applied to the common reset lead of counters 10–U1 through 10–U9 and 11–T1 through 11–T4 thereby resetting any operated ones of these counters to their off position. The pulse from amplifier 11–106 is also applied through condenser 11–C1, through diode 11–D1 and resistor 11–R1 to turn counter 11–T0 on, and also through diode 10–D1 and resistor 10–R2 to turn counter 10–U0 on. The pulse from amplifier 11–106 is also applied to the "reset pulse lead" RS and is of the form shown on FIG. 9D. The reset of counter 11–T4 inhibits gate 11–T4–2 and enables gate 11–T4–1. The reset pulse from amplifier 11–RS1 also turns flip-flop 10–UFF off thereby inhibiting gate 10–UFF-2 and enabling gate 10–UFF–1.

The circuit is now in the same condition as previously described with counters 10–U0 and 11–T0 on and awaiting the reception of the next series of timing pulses. The succeeding timing pulses advanced the counter circuit with the tens counter advancing one position for each ten pulses counted by the units counter circuit.

Each tens counter applies a positive direct current output pulse to its associated lead T0 through T4 for the duration that it remains on as shown in FIGS. 9I through 9M. These pulses together with the pulses generated by the other parts of the circuit on FIGS. 10 and 11 control the operation of the system comprising the present invention.

It should be observed that one counterstage of the units and tens counters must always be on in order for the circuit to function properly. This is necessary in order that the gate in the set lead of the succeeding counter position may be enabled. Since it is necessary that the circuit be functioning properly in order that the desired output pulses may be obtained, it is evident that in the event of trouble or when the circuit is turned on initially, a pulse from another source must be supplied before the timing pulses from source 10–101 will become effective. This pulse is supplied by pulse generator 11–104 which is of the free running type and has a cycle time somewhat greater than the time required for a complete cycle of operation of the tens counter chain. The circuit details of generator 11–104 are shown on FIG. 15. Its output is applied to an input of amplifier 11–106 and causes it to trigger and, in turn, set counters 10–U0 and 11–T0 in the manner already described.

Pulse generator 11–104 is normally kept synchronized with the reset pulse from amplifier 11–106 by the application of reset pulses to its sync input lead. Each sync pulse applied thereto triggers the pulse generator thus restarting the timing of a new cycle, which cycle is appreciably longer than the normal interval between pulses from amplifier 11–106. Therefore, pulse generator 11–104 will remain ineffective as long as the pulses from amplifier 11–106 appear at regular intervals. However, the absence of the normal pulses for a predetermined length of time will cause pulse generator 11–104 to generate internally an output pulse and reset the counter chains to position 00.

*Pulse amplifier (FIGURE 12)*

This circuit comprises a regenerative pulse amplifier of the monostable type which is capable of generating a rectangular shaped pulse with an amplitude and pulse width of approximately 18 volts and 35 microseconds respectively whenever it is triggered by an input pulse with a minimum amplitude and pulse width of 4.5 volts and 2 microseconds, respectively. This amplifier is used wherever control pulses have been attenuated to such an extent that they may not be capable for properly performing their functions.

Transistors 12–Q1 and 12–Q2 are arranged in a hook configuration. Normally the hook is off due to the back bias on the emitter base junction of 12–Q1, the base being at −6 volts while the emitter is at approximately −6.6 volts due to the current flowing from −6 volts through diode 12–D1 and resistor 12–R1 to −24 volts.

The combination of diode 12–D1 and resistor 12–R1 is used also to establish a current threshold on the amplifier input lead. The amplitude and pulse width of the input pulse must be sufficient to supply enough current to overcome the 12–D1 to 12–R1 bias current and also provide enough current to the emitter of 12–Q1 to turn the stage on. This biasing arrangement is used to prevent false triggering of the amplifier.

Resistor 12–R2 is a series limiting resistor which effectively isolates the triggering source from the amplifier and thereby prevents overshoot on the output pulse. The signal voltage in excess of that required to turn the stage on is dropped across this resistor. Diode 12–D2 provides a low impedance path for the saturation current after the amplifier has been turned on.

Capacitor 12–C3 is the timing capacitor which determines the output pulse width. Normally the capacitor is discharged, both of its sides being at −24 volts. When the hook is turned on the saturation current will charge the capacitor. As 12–C3 charges, the charging current will decrease exponentially until it is insufficient to maintain saturation. When this point is reached the hook will no longer conduct. Resistor 12–R5 provides a discharge path for capacitor 12–C3. Resistor 12–R6 provides a low resistance shunt around 12–Q2 in order to prevent excessive Ico multiplication during the amplifier off time.

When the amplifier is off the potentials at the following three points are as follows:

| | Volts |
|---|---|
| Emitter **12–Q1** | −6.6 |
| Base **12–Q1** | −6 |
| Output lead | −24 |

A positive input pulse with a minimum amplitude of 4.5 volts and a minimum pulse width of 2 microseconds will overcome the biasing current and forward bias the emitter base junction of 12–Q1. The regenerative characteristics of the circuit will cause transistors Q1 and Q2 to go into saturation. The input pulse causes the emitter of 12–Q1 to go positive until the hook turns on at which time the emitter is returned to about 6.6 volts due to the drop across diode 12–D2. During this time capacitor 12–C3 is charging. The large initial charging current will maintain 12–Q1 and 12–Q2 in saturation after the input trigger pulse has expired.

During the time 12–Q1 and 12–Q2 are saturated, the output of the amplifier is at approximately −7 volts. The base of 12–Q1 is at −7 volts while the emitter of 12–Q1 is at −6.6 volts approximately.

As the voltage builds up across capacitor 12–C4 the charging current decreases. In approximately 35 microseconds it will have decreased to the point where 12–Q2 can no longer conduct at saturation. This causes 12–Q2 and 12–Q1 to be cut off. The circuit then returns to its stable condition with its output at −24 volts. With 12–Q2 cut off capacitor 12–C3 discharges through resistor 12–R5.

*Reset amplifier (FIG. 13)*

The output of this amplifier is normally connected to the common reset lead of a flip-flop. Its function, when it is turned on, is to apply a potential to the flip-flop common reset lead which will turn the flip-flop off and inhibit subsequent operation of the flip-flop as long as the reset amplifier remains on.

The fact that only one transistor is required and that one reset amplifier can reset many flip-flops simultaneously makes it more feasible to use a separate amplifier for reset purposes rather than the pulse amplifier of FIG. 12.

The amplifier will remain on for about 40 microseconds after it is triggered by a positive going signal on its input if the stage connected to its output continues to draw current. The output waveshapes shown on FIG. 13 illustrate the condition which would exist if the flip-flop being reset continued to draw current indefinitely after the reset amplifier turned on. In actual practice a trouble free flip-flop will turn off within 10 microseconds after a reset pulse is applied and the pulse width of the reset amplifier output will therefore be approximately 10 microseconds.

The reset amplifier is a normally cut-off emitter follower stage. When the amplifier is off, the base of the amplifier transistor is at approximately −9.5 volts and its emitter at −8 volts, assuming the flip-flop to which the output lead is connected is on. The amplifier is turned on by the application of a positive going signal to the input lead. This positive signal drives the emitter follower into saturation thereby putting the output lead (emitter) at ground. Ground on the amplifier output lead is applied to the common reset lead of the associated flip-flop thereby turning the flip-flop off. The reset amplifier will remain on for about 40 microseconds. This time is a function of the time constant of the input capacitor and the associated network resistance. A pulse of approximately 10 microseconds duration is required in order to reset a flip-flop.

*Flip-flop (FIG. 14)*

This circuit comprises a bistable flip-flop with an emitter buffer. Its output can be either −24 volts or −7 volts. When the flip-flop is in its normal or off condition the potential at its output lead is −24 volts. When the flip-flop is "set," that is turned on, the potential at its output lead is approximately —7 volts.

A positive pulse on the set lead is required to turn the flip-flop on. A positive pulse on the reset lead will cause the flip-flop to be turned off (reset). A flip-flop may also be reset by applying a positive signal to the common reset lead.

Transistors 14–Q1 and 14–Q2 are arranged in a hook configuration. An RL network is associated with the hook which comprises resistor 14–R10 and inductor 14–L1 in parallel. It is used to prevent excessive Ico multiplication during flip-flop off time. The network also enables the circuit to have a low steady alpha which, in turn, decreases the amount of current required to turn the flip-flop off. Transistor 14–Q3 is used as a buffer amplifier. The usual application for the buffer output is to operate a relay associated with the flip-flop. Thus 14–Q3 provides isolation between the relay load and the flip-flop output.

Diode 14–D4 is used to provide isolation between this and other flip-flops which are connected to the common reset lead. Diode 14–D3 isolates the base of the hook 14–Q1 from the reset network. Diode 14–D2, in conjunction with resistor 14–R6 is used to prevent excessive voltages from developing across the hook transistors.

The junction of resistors 14–R4 and 14–R5 is at approximately —9 volts. This potential back biases diodes 14–D3 and 14–D2. When the flip-flop is on, the base of 14–Q1 is at about —8 volts, therefore, 14–D3 is only back biased by about 1 volt. A positive reset pulse will cause current to flow in the forward direction through 14–D3. Diode D2 will prevent the potential at the base of the hook from rising above ground since it will provide a low impedance path to ground as soon as the junction of 14–D2 and 14–D3 attempts to go more positive than ground.

When the flip-flop is in its off condition, the set lead is at approximately —5.4 volts due to the voltage divider action of the 14–R2 and 14–R3 resistors. If there is a load connected to the buffer output terminal it should be at —24 volts since transistor 14–Q3 is off at this time and the other side of the load should be connected to —24 volts. Since the hook (14–Q1 and 14–Q2) is off, the flip-flop output is also at —24 volts and the base of transistor 14–Q1 is at ground potential.

The flip-flop is turned on by applying a positive pulse in excess of 5.4 volts to the set lead. This will cause transistors 14–Q1 and 14–Q2 to conduct. When 14–Q1 and 14–Q2 are saturated the flip-flop output goes from —24 to approximately —7 volts. The time required for this transition is approximately one microsecond.

When 14–Q1 is saturated its emitter is at —7 volts. This causes the base of 14–Q3 to go more negative than —6 volts thereby turning this transistor on. When 14–Q3 is turned on the potential at the buffer output goes from —24 to approximately —7 volts.

The flip-flop is reset by applying a positive pulse to the individual reset lead or by placing the common reset lead at ground potential. Either type of reset has the effect of turning off transistor 14–Q1. This, in turn, turns off 14–Q2 and 14–3 returning the flip-flop to normal.

The following table indicates the potentials as several test points for the two possible flip-flop conditions.

| Test Point | Potential | |
|---|---|---|
| | Set (on) | Reset (off) |
| Q1 Base | —8 | Ground. |
| Flip-Flop output | —7 | —24. |
| Set lead | —7 | —5.4. |
| Buffer output | —7 | —24 (if a load is connected to the buffer). |

*Pulse generator (FIG. 15)*

This circuit comprises a pulse generator whose output frequency is determined by the connections external thereto. This particular circuit has two applications in the present system. The first application is as the timing pulse source 10–101 on FIG. 10. The output of this circuit is used as the basis of all the timing and scanning pulses used throughout the system. An ideal pulse frequency for this application is 250 pulses per second. Another application of this circuit is to supply the initial reset pulse for the scanner pulse generator of FIGS. 10 and 11. An ideal output frequency for this application would be two pulses per second.

The output pulse of this circuit is approximately 18 volts in amplitude. The —24 volt potential at terminal A is obtained by connecting terminal A to the midpoint of a voltage divider network connected between terminal C and ground. This is done in order to make the pulse repetition frequency and the interpulse time substantially independent of any supply voltage variations. The output frequency of the pulse generator may be changed from 250 pulses per second to two pulses per second by strapping terminals A and B together.

Circuit operation can best be described by first examining the pulse generator during the interpulse time. The output lead potential at this time is approximately —24 volts. The emitter of 15–Q2 is at —8 volts due to the charge remaining on capacitor 15–C2 from the previous pulse. The base of 15–Q1 is at —6 volts and the emitter of 15–Q1 is also as —6 volts.

During the interpulse time capacitor 15–C2 discharges from —8 volts toward —48 volts through the 15–R4 resistor. Therefore, the potential at the emitter of 15–Q2 is decreasing exponentially from —8 volts toward —48 volts. When the potential at this point reaches —24 volts or slightly more negative, the 15–Q2 transistor emitter junction becomes slightly forward biased and the transistor is turned on. The connections around the 15–Q1 and 15–Q2 transistors form a closed regenerative feedback loop. The gain around the regenerative loop reinforces and amplifies the initial forward conduction in the 15–Q2 transistor and both transistors rapidly turn "on" and become saturated. The output potential changes from —24 volts to approximately —7 volts and remains at this point as long as both transistors are saturated. The emitter of 15–Q2 is now at approximately —8 volts and the 15–C2 capacitor starts to charge up to this potential through the 15–R3 resistor. When both transistors are saturated the emitter of 15–Q1 is at approximately —7 volts while its base is near —8 volts. Transistor 15–Q2 remains on as long as the charging current through 15–R3 is sufficient to maintain saturation. When the emitter current becomes insufficient to maintain transistor saturation both transistors will rapidly be returned to their off condition and interpulse timing will start again.

The pulse generator is designed so that the pulse width represents three percent of the total period. Consequently, for 250 pulses per second operation the pulse width is about 100 microseconds and for 2 pulses per second operation the pulse width is 15 milliseconds.

*Transmitting amplifier (FIG. 16)*

This circuit comprises a transmitting amplifier which is used exclusively to generate the pulses which are transmitted over the trunks between the central offices and the answering service center. This amplifier has an output which provides the current necessary to drive the signaling transformers. The need for this relatively large output current is the main reason why this amplifier is used for transmission purposes rather than the pulse amplifier of FIG. 12.

Transistor 16–Q1 is used as a buffer amplifier to provide the current required to drive the signaling transformer. 16–Q1 also provides isolation between the bistable portion of the circuit and the load. Diode 16–D2 is a protection diode which will protect the 16–Q1 transistor against line surges. Protection for 16–Q1 is required because its output is connected directly to the signaling circuit transformer. Resistors 16–R2 and 16–R4 are series limiting resistors used to protect the 16–Q1 transistor and the 16—D2 diode.

Transistors 16–Q2 and 16–Q3 are arranged in a hook configuration. The network, consisting of a resistor 16–R9 and inductor 16–L1 in parallel, is used to prevent excessive Ico multiplication during the amplifier off time. The network also enables the circuit to have a low steady state alpha which, in turn, decreases the amount of current required to turn the stage off. Transistor 16–Q4, in conjunction with resistors 16–R5 and 16–R7 and capacitor 16–C2 comprises the timing network which determines the output pulse width. Transistor 16–Q4 is normally conducting and capacitor 16–C2 is charged with ground on its 16–Q4 side and —24 volts on the other.

When the amplifier is off, the potentials at the various test points are as follows. The emitter of 16–Q2 is at —5.4 volts due to the voltage divider action of the 16–R1 and 16–R3 resistors. The base of 16–Q2 is at ground due to the fact that 16–Q4 is conducting at saturation. The base of 16–Q4 is at ground for the same reason. Since the hook is off, the right-hand side of resistor 16–R6 will see —24 volts through the 16–R8 resistor. Transistor 16–Q1 is not conducting and its collector will be at —24 volts because the output lead is connected to —24 volts through the signaling transformer winding.

When a positive pulse is applied to the input, it is amplifier by the hook connected pair, appears at the collector of the hook, is coupled through condenser 16–C2 and turns 16–Q4 off. When 16–Q4 turns off, the hook will be turned on if the input signal is still present on the input lead. In practice the pulse width of the input signal exceeds the time required to turn 16–Q4 off. With 16–Q4 off and the hook on, the output of the amplifier will go to —7 volts.

When the amplifier is on, the potentials at the several test points are as follows. The base of 16–Q2 is at approximately —7 volts, the right-hand side of 16–R6, the emitter of 16–Q2, and the output are also at approximately —7 volts. When the hook was turned on, the base of 16–Q4 went to +17 volts due to the charge on capacitor 16–C2. However, with 16–Q4 off 16–C2 will discharge through 16–R5 and, when the base of 16–Q4 becomes forward biased, 16–Q4 will turn on. 16–Q4 turning on causes the hook to turn off returning the amplifier to the off condition.

*Receiving amplifier (FIG. 17)*

This amplifier is used exclusively to receive and amplify the pulses which are transmitted over the signaling trunk pairs. The receiving circuit usually consists of two receiving amplifiers connected to opposite ends of the coupling transformer winding. This circuit configuration permits only one receiving amplifier to be triggered at a time depending upon the polarity of the incoming signal. This amplifier, when triggered by a positive pulse, will generate a pulse having an amplitude of about 18 volts and a pulse width of about 40 microseconds.

The pulse which triggers this amplifier is generated by a transmitting amplifier at the opposite end of the signaling trunk. The sensitivity of this amplifier must be quite high since the transmitted pulses are considerably attenuated by the trunk pairs. This sensitivity requirement is one reason why the receiving amplifier differs in design from the pulse amplifier of FIG. 12.

Diode 17–D1 serves as a protection against surges in the line while resistor 17–R2 acts as a series limiting resistor to prevent excessive voltage from developing across 17–D1.

Transistors 17–Q2 and 17–Q3 are arranged in a hook configuration. The hook, and therefore the amplifier, is off as long as transistor 17–Q1 is conducting. Transistor 17–Q1 is normally conducting and will be cut off only when a positive pulse greater than 0.5 volt in amplitude appears on the input lead. By controlling the base current in transistor 17–Q1, it is possible to control the sensitivity of the amplifier because 17–Q1 cannot be turned off until the current due to the input signal is sufficient to overcome the 17–Q1 base current.

Capacitor 17–C1 and 17–C3 are used to provide direct current isolation between the amplifier and the input network. The large value of capacitance needed required the use of electrolytics. They are made effectively nonpolar by connecting them back to back.

The amplifier is monostable due to the presence of capacitor 17–C2 and the 17–Q3 emitter. When the hook is turned on the saturating current charges capacitor 17–C2. As 17–C2 charges the current will decrease exponentially until it reaches the point where it is not sufficient to maintain saturation. At that time the hook will turn off. Capacitor 17–C2 will then discharge through resistor 17–R8 in parallel with the series combination of diode 17–D2 and resistor 17–R7. Resistor 17–R7 also provides a low resistance shunt around 17–Q2 in order to prevent excessive Ico multiplication during the amplifier off time.

When the amplifier is normal transistor 17–Q1 is in a conducting state due to current flowing in its emitter in series with resistor 17–R4 to —6 volts. The emitter of 17–Q2 is thus back biased and the output terminal of the circuit is at approximately —24 volts. At this time the base of 17–Q2 is at —.5 volt and the base of 17–Q1 is at —.5 volt.

A positive signal applied to the input terminal will cause 17–Q1 to be cut off. When 17–Q1 is cut off 17–Q2 is no longer back biased and therefore emitter current will flow in 17–Q2. The hook pair, 17–Q2 and 17–Q3, will immediately go into saturation causing the output lead to rise to approximately —7 volts. When the amplifier is turned on the 17–C2 capacitor starts to charge to the —7 volt potential at the output. Transistor 17–Q1 remains off for the duration of the positive input pulse.

It is to be understood that the above-described arrangements are but illustrative of the application of the principles of the invention. Numerous other arrangements may be devised by those skilled in the art without departing from the spirit and scope of the invention.

What is claimed is:

1. In a central office, a plurality of subscriber lines incoming thereto, an answering service center remote from said central office, trunks extending to said center, said trunks being lesser in number than the number of lines, a scanner for repeatedly and sequentially testing each line to ascertain whether it is in an idle or a ringing condition, means responsive to said scanner for transmitting information over said trunks pertaining to the idle or ringing condition of each line, and means at said center responsive to the receipt of said information to provide a simultaneous indication of all of said lines currently in a ringing condition.

2. In a central office, a plurality of subscriber lines incoming thereto, an answering service center remote from said central office, a trunk extending to said center, a scanner for repeatedly and sequentially testing each line to ascertain whether it is in an idle or a ringing condition, means responsive to said scanner for transmitting information over said trunk pertaining to the idle or ringing condition of each line, and means at said center responsive to the receipt of said information for simultaneously manifesting all of said lines currently in a ringing condition.

3. In a central office, a plurality of subscriber lines incoming thereto, an answering service center remote from said central office, trunks extending to said center, said trunks being lesser in number than the number of said lines, a scanner for repeatedly and sequentially testing each line to ascertain whether it is in an idle or a ringing condition, means responsive to said scanner for transmitting information over said trunks pertaining to the idle or ringing condition of each line, a plurality of gates at said answering service center each of which is individually associated with one of said lines, means including said scanner for sequentially enabling said gates in synchronism with said scanner, and means at said center including said gates for providing a simultaneous indication of all lines currently in a ringing condition.

4. In a central office, a plurality of subscriber lines incoming thereto, an answering service center remote from said central office, a plurality of trunks extending to said center, said trunks being lesser in number than the number of said lines, a scanner for repeatedly and sequentially testing each line to ascertain whether it is in an idle or a ringing condition, means responsive to said scanner for transmitting information over said trunks pertaining to the idle or ringing condition of each line, a counter at said answering center having a plurality of operative positions, a plurality of gates at said answering service center each of which is individually associated with one of said lines and with an operative position of said counter, means including said scanner for transmitting signals over said trunk to operate said counter in synchronism with said scanner, means including said counter for sequentially enabling said gates in synchronism with said counter, and means at said center including said gates responsive to the receipt of said information for simultaneously providing an indication of the current condition of all lines.

5. In a central office, a plurality of subscriber lines incoming thereto, an answering service center remote from said central office, a plurality of trunks extending to said center, said trunks being lesser in number than the number of said lines, a scanner for repeatedly and sequentially testing each line to ascertain whether it is in an idle or a ringing condition, means responsive to said scanner for transmitting information over said trunks pertaining to the idle or ringing condition of each line, a counter at said answering center having a plurality of operative positions, a plurality of gates at said answering service center each of which is individually associated with one of said lines and with an operative position of said counter, means including said scanner for transmitting signals over said trunk to operate said counter in synchronism with said scanner, means including said counter for sequentially enabling said gates in synchronism with said counter, display means at said center for each of said lines, means whereby an enthe line associated with said gate and said display means when information representing the ringing condition of the line associated with said gate and said display means is received at said center at the time said gate is enabled, and means for maintaining the operation of each operated display means as long as the line associated therewith remains in a ringing condition.

6. In a central office, a plurality of subscriber lines incoming thereto, an answering center remote from said central office, trunks lesser in number than the number of subscriber lines interconnecting said central office and said answering center, a scanner at said central office for repeatedly and sequentially testing each line to ascertain whether it is in a ringing or an idle condition, means responsive to said scanner for transmitting over said trunks information signifying the idle or ringing condition of each line to said answering service center, enabling means at said answering center operated in synchronism with said scanner, a plurality of control circuits and indicators at said center each of which is individual to one of said subscriber lines, means whereby the receipt of said information and said enabling means coadjuvantly effect the operation of each control circuit and indicator associated with a line currently in a ringing condition, and means for maintaining each indicator operated as long as its line remains in a ringing condition.

7. In a central office, a plurality of subscriber lines incoming thereto, an answering center remote from said central office, a plurality of trunks lesser in number than the number of subscriber lines interconnecting said central office and said answering center, a scanner at said central office for repeatedly and sequentially testing each line to ascertain whether it is in a ringing or an idle condition, means responsive to said scanner for transmitting over said trunks information signifying the idle or ringing condition of each line to said answering service center, enabling means at said answering center operated in synchronism with said scanning means, a plurality of control circuits and indicators at said answering center each of which is individual to one of said subscriber lines, means whereby the receipt of said information and said enabling means coadjuvantly effect the transmission of a signal to a control circuit associated with a called line in response to a ringing condition thereon, means responsive to said signal to operate said control circuit and energize its associated indicator, a switch at said answering center associated with each of said control circuits, and means whereby the closure of the switch associated with an operated control circuit applies the next signal received at said answering center and pertaining to said called line to one of said trunks for transmission back to said central office.

8. In a central office, a plurality of subscriber lines incoming thereto, an answering center remote from said central office, a plurality of trunks lesser in number than the number of subscriber lines interconnecting said central office and said answering center, a scanner at said central office for repeatedly and sequentially testing each subscriber line to ascertain whether it is in an idle or a ringing condition, means responsive to said scanner for transmitting over said trunks information signifying the idle or busy condition of each line to said answering service center, enabling means at said answering center operated in synchronism with said scanning means, a plurality of control circuits and indicators at said answering center each of which is individual to one of said subscriber lines, means whereby the receipt of said information and said enabling means coadjuvantly effect the operation of a control circuit and indicator associated with a called line in response to a ringing condition thereon, an answering position at said answering center having a switch associated with each of said control circuits, means whereby the closure of the switch associated with an operated control circuit applies a signal received at said answering center and pertaining to said called line to one of said trunks for transmission back to said central office, and means at said central office responsive to the receipt of said signal for momentarily arresting the operation of said scanner in its position associated with the line represented by said received signal.

9. In a central office, a plurality of subscriber lines incoming thereto, an answering center remote from said central office, a plurality of trunks lesser in number than the number of subscriber lines interconnecting said central office and said answering center, a scanner at said central office for repeatedly and sequentially testing each subscriber line to ascertain whether it is in an idle or a ringing condition, means responsive to said scanner for transmitting over said trunks information signifying the idle or busy condition of each line to said answering service center, enabling means at said answering center operated in synchronism with said scanning means, a plurality of control circuits and indicators at said answering center each of which is individual to one of said subscriber lines, means whereby the receipt of said information and said enabling means coadjuvantly effect the operation of a control circuit and indicator associated with a called line during a ringing condition thereon, an answering position connected to one of said trunks at said anwsering center, a switch associated with each of said control circuits, means whereby the closure of the switch associated with an operated control circuit applies a signal received at said answering center and pertaining to said called line to one of said trunks for transmission back to said central office, means at said central office responsive to the receipt of said signal for momentarily arresting the operation of said scanner in its position associated with the line represented by said received signal, and means at said central office responsive to the momentary cessation of operation of said scanner for interconnecting said answering position with said called line.

10. In a central office, a plurality of subscriber lines incoming thereto, an answering center remote from said central office, a talking trunk interconnecting said central office and said answering center, a plurality of signaling trunks lesser in number than the number of subscriber lines interconnecting said central office and said answering center, a scanner at said central office for repeatedly and sequentially testing each subscriber line to ascertain whether it is in an idle or a ringing condition, means responsive to said scanner for transmitting over said signaling trunks information signifying the idle or busy condition of each line to said answering service center, enabling means at said answering center operated in synchronism with said scanning means, a plurality of control circuits and indicators at said answering center each of which is individual to one of said subscriber lines, means whereby the receipt of said information and said enabling means coadjuvantly effect the operation of a control circuit and indicator associated with a called line in response to a ringing condition thereon, an answering position connected to said talking trunk at said answering center, a switch associated with each of said control circuits, means whereby the closure of the switch associated with an operated control circuit applies a signal received at said answering center and pertaining to said called line to one of said signaling trunks for transmission back to said central office, means at said central office responsive to the receipt of said signal for momentarily arresting the operation of said scanner in its position associated with the line represented by said received signal, and means at said central office responsive to the momentary cessation of operation of said scanner for interconnecting said answering position with said called line.

11. In combination, a central office having a plurality of subscriber lines incoming thereto, an answering center remote from said central office, a trunk extending from said office to said center, a matrix having a plurality of crosspoints each of which is associated with and connected to an individual one of said lines, each crosspoint having an enabling and a ringing input, means for repeatedly applying a signal to the enabling input of each crosspoint in sequence, means for applying a signal to the ringing input of each crosspoint whenever its associated line is in a ringing condition, means responsive to the presence of simultaneous signals on both inputs of any crosspoint for applying a signal to said trunk signifying the ringing condition of its associated line, and means at said center responsive to the signals applied to said trunk for simultaneously manifesting all lines currently in a ringing condition.

12. In combination, a central office having a plurality of subscriber lines incoming thereto, an answering center remote from said central office, a trunk extending from said office to said center, a matrix having a plurality of crosspoints each of which is associated with and connected to an individual one of said lines, each crosspoint having an enabling and a ringing input, a pulse generator for repeatedly applying a signal to the enabling input of each crosspoint in sequence, means for applying a signal to the ringing input of each crosspoint whenever its associated line is in a ringing condition, means responsive to the presence of signals on both inputs of any crosspoint simultaneously for applying a signal to said trunk signifying the ringing condition of its associated line, a counter at said center operated in synchronism with said pulse generator and means including said counter at said center responsive to said pulse generator and to the signals applied to said trunk for simultaneously manifesting all lines currently in a ringing condition.

13. In combination, a central office having a plurality of subscriber lines incoming thereto, an answering center remote from said central office, trunks extending from said office to said center, said trunks being lesser in number than said lines, a matrix having a plurality of crosspoints each of which is associated with and connected to an individual one of said lines, each crosspoint having an enabling and a ringing input, a pulse generator for repeatedly applying a signal to the enabling input of each crosspoint in sequence, said pulse generator also applying synchronizing signals to some of said trunks for transmission to said center, means for applying a signal to the ringing input of each crosspoint whenever its associated line is in a ringing condition, means responsive to the presence of signals on both inputs of a crosspoint simultaneously for applying a ringing signal to one of said trunks to signify the ringing condition of the line associated with said last-named crosspoint, a counter having a plurality of operative positions at said center, means responsive to said synchronizing signals received over said trunks for operating said counter in synchronism with said pulse generator, a plurality of gates at said center one for each operative position of said counter and for each line at said central office, means whereby said counter enables said gates momentarily and consecutively, means whereby said ringing signals are applied to a plurality of said gates, display means, and means whereby the enabled gate to which a ringing signal is currently applied effects the operation of said display means to manifest a line currently in a ringing condition.

References Cited in the file of this patent

UNITED STATES PATENTS

| | | |
|---|---|---|
| 2,685,614 | Curtin | Aug. 3, 1954 |
| 2,782,256 | Malthaner | Feb. 19, 1957 |
| 2,812,385 | Joel et al. | Nov. 5, 1957 |
| 2,863,950 | Dunning et al. | Dec. 9, 1958 |